United States Patent
Rozas

(10) Patent No.: US 10,761,748 B2
(45) Date of Patent: Sep. 1, 2020

(54) FUTURE WRITE IN DISTRIBUTED SYSTEM MAINTAINING DATA STORAGE INTEGRITY

(71) Applicant: Datera, Incorporated, Mountain View, CA (US)

(72) Inventor: Guillermo J. Rozas, Los Gatos, CA (US)

(73) Assignee: DATERA, INCORPORATED, Mountain View, CA (US)

( * ) Notice: Subject to any disclaimer, the term of this patent is extended or adjusted under 35 U.S.C. 154(b) by 0 days.

(21) Appl. No.: 16/056,312

(22) Filed: Aug. 6, 2018

(65) Prior Publication Data

US 2020/0042199 A1 Feb. 6, 2020

(51) Int. Cl.
- *G06F 3/08* (2006.01)
- *H04L 29/08* (2006.01)
- *G06F 3/06* (2006.01)

(52) U.S. Cl.
CPC ............ *G06F 3/0619* (2013.01); *G06F 3/067* (2013.01); *G06F 3/0656* (2013.01); *H04L 67/2842* (2013.01)

(58) Field of Classification Search
CPC ...... G06F 3/0619; G06F 3/0656; G06F 3/067; H04L 67/2842; H04J 3/0673
See application file for complete search history.

(56) References Cited

U.S. PATENT DOCUMENTS

| | | |
|---|---|---|
| 6,170,063 B1 | 1/2001 | Golding |
| 2012/0102006 A1* | 4/2012 | Larson ................ G06F 16/1865 707/703 |
| 2015/0280959 A1 | 10/2015 | Vincent |
| 2017/0075627 A1* | 3/2017 | Pradeep .................. G06F 16/13 |
| 2018/0039485 A1* | 2/2018 | Wilber .................... G06F 7/588 |

OTHER PUBLICATIONS https://web.archive.org/web/20170301205415/https://hbase.apache.org/book.html#_hbase_as_a_mapreduce_job_data_source_and_data_sink showing Hbase applications contain write requests (Year: 2017).*

\* cited by examiner

*Primary Examiner* — Mano Padmanabhan
*Assistant Examiner* — Janice M. Girouard

(57) ABSTRACT

A method for performing a write operation in a distributed storage system is disclosed. The method comprises receiving a first time-stamped write request from a proxy server. Further, the method comprises determining if the first time-stamped write request is within a time window of a reorder buffer and if the first time-stamped write request overlaps with a second time-stamped write request in the reorder buffer. Responsive to a determination that the first time-stamped write request is outside the time window or that the first time-stamped write request is within the time window but has an older time-stamp than the second time-stamped write request, the method comprises rejecting the first time-stamped write request. Otherwise, the method comprises inserting the first time-stamped write request in the reorder buffer in timestamp order and transmitting an accept to the proxy server.

20 Claims, 9 Drawing Sheets

FUTURE WRITE IN DISTRIBUTED SYSTEM MAINTAINING DATA STORAGE INTEGRITY

CROSS-REFERENCE TO RELATED APPLICATIONS

The present application is related to U.S. patent application Ser. No. 16/056,286, filed Aug. 6, 2018, entitled "Ordinary Write in Distributed System Maintaining Data Storage Integrity," naming Guillermo Rozas as inventor. That application is incorporated herein by reference in its entirety and for all purposes.

FIELD OF THE INVENTION

Embodiments according to the present invention generally relate to data storage systems and, more particularly, to distributed data storage systems.

BACKGROUND OF THE INVENTION

Distributing data storage over different storage servers in a computer system or computer network has many advantages. Increasing capacity is a clear advantage; not needing to fit all available storage into a single device allows for a much larger storage space. Another advantage is flexibility. System designers can place storage devices substantially anywhere, in any configuration, with any combination of technologies, as long as some form of network is available to connect the entities that need to access the storage servers and the storage servers themselves, either directly or through some form of proxies.

The advantages of distributed storage systems, however, are accompanied by challenges. For example, two challenges in this context are coordination and issues of latency. Assume, for example, that two different entities need to write to the same portion of the available address space at almost the same time. It becomes problematic to determine which set of write data should be present in storage at the end of these two write operations, especially in an environment in which the time it takes for each entity to communicate its write request may be different because of differences in network latency and where the two sets of write data may be different.

One known answer to this race condition involves locks. In lock-based systems, whichever entity obtains and holds a lock is allowed to complete its write operation to a given resource, while other entities must wait. Although this resolves write conflicts, it does so at the cost of inefficiency, as contested locks add latency and, furthermore, require a lock server and a lock manager. Moreover, lock managers themselves suffer from lack of scalability, inasmuch as the prevalence of false conflicts must be balanced against the granularity of the lock. Lock management becomes even more complex in distributed systems.

In a similar vein, some systems require writing entities to obtain tokens in order to write, which then requires relatively complicated mechanisms for distributing the tokens, for arbitrating which entity gets which token, and for determining the tokens' order of priority. In some other systems, a supervisory system issues a transaction ID for each I/O operation, but this arrangement often adds significant delay.

Still other known solutions synchronize writes relative to logical clocks, such as a vector clock or a Lamport timestamp to be able to detect causality violations. The main disadvantages of such systems are that they require not only communication across storage clusters, but also usually entail coordinating signals over several round trips—virtual clocks have high overhead when a total order is desired, as they require many more messages. Furthermore, even total-order versions of virtual clocks can incur causality violations when writing entities communicate directly with each other, without passing these communications, in particular I/O requests, through the higher level storage system controllers.

Partial-order versions of arrangements based on virtual clocks are less onerous in terms of overhead but are more likely to expose causality violations; virtual clocks preserve causality only internal to the storage system. If the applications using the storage system can also communicate "out of band", for example, using sockets or time or another independent storage cluster, the virtual clocks will be unaware of all the causality relationships and the storage system can appear to violate causality.

BRIEF SUMMARY OF THE INVENTION

Accordingly, what is needed is a method to store data without ambiguity that does not require time-wasting communication and coordination among either I/O-requesting entities and/or storage servers, in particular, to ensure against causality violations. Further, what is needed is a method of performing read and, in particular, write operations in distributed storage systems that maintain data integrity and do not suffer from the complexity and failure rate of existing solutions such as those that rely primarily on lock mechanisms. What is also needed is a system that addresses the above problems while being scalable.

Embodiments of the present invention provide a method of performing writes and reads in a distributed storage system wherein data is mirrored across several data storage nodes. Embodiments of the present invention perform reads and writes using a time-stamp based model to ensure consistency in the way writes and reads are performed across multiple nodes. Consistency is achieved by augmenting the read or write request with a timestamp and using a well-synchronized clock, e.g., GPS receivers, between the storage nodes. The timestamp on a write request received from a client, for example, can be affixed by a proxy server (which is an intermediary between a client and a storage node) before it is transmitted to the storage node. Each of the storage nodes further comprises a re-order buffer, which is a finite, timestamp-ordered data structure where the read and write requests are held while their timestamps are examined. The reorder buffer may "reorder" requests in the sense that it may be used, for example, to reject "out of order" writes that may have resulted from clock drift/skew, network latency, or other synchronization errors. Requests drain out of the re-order buffer into the underlying storage devices where the write or read operation is actually performed.

The storage nodes service the read or write requests in accordance with the timestamps to avoid causality violations and to ensure that all active storage servers in the cluster have the same data, such that there are no consistency violations to either multiple clients or a single client using multiple connections (multipath).

In one embodiment, a method for performing a write operation in a distributed storage system is disclosed. The method comprises receiving a first time-stamped write request from a proxy server. The method also comprises determining if the first time-stamped write request is within a time window of a reorder buffer and if the first time-stamped write request overlaps with a second time-stamped write request in the reorder buffer, wherein the second time-stamped write request is received from a different proxy server. Responsive to a determination that the first time-stamped write request is outside the time window, the method comprises rejecting the first time-stamped write request. Further, responsive to a determination that the first time-stamped write request is within the time window and has an older time-stamp than the second time-stamped write request, the method comprises rejecting the first time-stamped write request. Otherwise, the method comprises inserting the first time-stamped write request in the reorder buffer in timestamp order and transmitting an accept to the proxy server.

In another embodiment, a computer-readable storage medium having stored thereon, computer executable instructions that, if executed by a storage server causes the storage server to perform a method for performing a write operation in a distributed storage system is disclosed. The method comprises receiving a first time-stamped write request from a proxy server. The method also comprises determining if the first time-stamped write request is within a time window of a reorder buffer and if the first time-stamped write request overlaps with a second time-stamped write request in the reorder buffer, wherein the second time-stamped write request is received from a different proxy server. Responsive to a determination that the first time-stamped write request is outside the time window, the method comprises rejecting the first time-stamped write request. Further, responsive to a determination that the first time-stamped write request is within the time window and has an older time-stamp than the second time-stamped write request, the method comprises rejecting the first time-stamped write request. Otherwise, the method comprises inserting the first time-stamped write request in the reorder buffer in timestamp order and transmitting an accept to the proxy server.

In another embodiment, a storage server for performing a write operation in a distributed storage system is disclosed. The storage server comprises a memory comprising a reorder buffer and a cache associated with the reorder buffer; a communicative interface operable to allow communication between a plurality of proxy servers; and a storage controller comprising a processor, wherein the processor is coupled to the memory and the communicative interface. The processor is configured to: a) receive a first time-stamped write request from a proxy server; b) determine if the first time-stamped write request is within a time window of the reorder buffer and if the first time-stamped write request overlaps with a second time-stamped write request in the reorder buffer, wherein the second time-stamped write request is received from a different proxy server; c) responsive to a determination that the first time-stamped write request is outside the time window, reject the first time-stamped write request; d) responsive to a determination that the first time-stamped write request is within the time window and has an older time-stamp than the second time-stamped write request, reject the first time-stamped write request; and e) otherwise, insert the first time-stamped write request in the reorder buffer in timestamp order and transmit an accept to the proxy server.

In one embodiment, a method for performing a write operation in a distributed storage system is disclosed. The method comprises receiving a time-stamped write request from a client at a proxy server and responsive to a determination that the time-stamped write request has been retried over a threshold number of times, the method comprises setting a status for the time-stamped write request as a future write and adding a first offset to a timestamp of the time-stamped write request. Further, the method comprises transmitting the time-stamped write request to a storage server comprising a reorder buffer and a future buffer, wherein the reorder buffer maintains a time window comprising an interval of time into a past from a current time and an interval of time into a future from the current time, and wherein a time window of the future buffer starts at a future time where the time window of the reorder buffer ends. The method also comprises receiving an accept from the storage server, responsive to a determination at the storage server that the time-stamped write request is within the time window of the future buffer, wherein the accept originates from the storage server in response to the storage server inserting the time-stamped write request into the future buffer.

In a different embodiment, a computer-readable storage medium having stored thereon, computer executable instructions that, if executed by a proxy server cause the proxy server to perform a method for performing a write operation in a distributed storage system is disclosed. The method comprises receiving a time-stamped write request from a client at a proxy server and responsive to a determination that the time-stamped write request has been retried over a threshold number of times, the method comprises setting a status for the time-stamped write request as a future write and adding a first offset to a timestamp of the time-stamped write request. Further, the method comprises transmitting the time-stamped write request to a storage server comprising a reorder buffer and a future buffer, wherein the reorder buffer maintains a time window comprising an interval of time into a past from a current time and an interval of time into a future from the current time, and wherein a time window of the future buffer starts at a future time where the time window of the reorder buffer ends. The method also comprises receiving an accept from the storage server, responsive to a determination at the storage server that the time-stamped write request is within the time window of the future buffer, wherein the accept originates from the storage server in response to the storage server inserting the time-stamped write request into the future buffer.

In one embodiment, a proxy server for performing a write operation in a distributed storage system is disclosed. The proxy server comprises a memory comprising instructions for a protocol to perform a write operation; a communicative interface operable to allow communication between a plurality of storage servers; and a controller comprising a processor. The processor is coupled to the memory and the communicative interface, and is configured to: a) receive a time-stamped write request from a client; b) responsive to a determination that the time-stamped write request has been retried over a threshold number of times, change a status for the time-stamped write request to a future write and adding a first offset to a timestamp for the time-stamped write request; c) transmit the time-stamped write request to a storage server comprising a reorder buffer and a future buffer, wherein the reorder buffer comprises a time window comprising an interval of time into a past from a current time and an interval of time into a future from the current time, and wherein a time window of the future buffer starts at a future time where the time window of the reorder buffer ends; d) receive an accept from the storage server, responsive to a determination at the storage server that the time-stamped write request is within a time window of the future buffer, wherein the accept originates from the storage server in response to the storage server inserting the time-stamped write request into the future buffer.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

Figure 1:
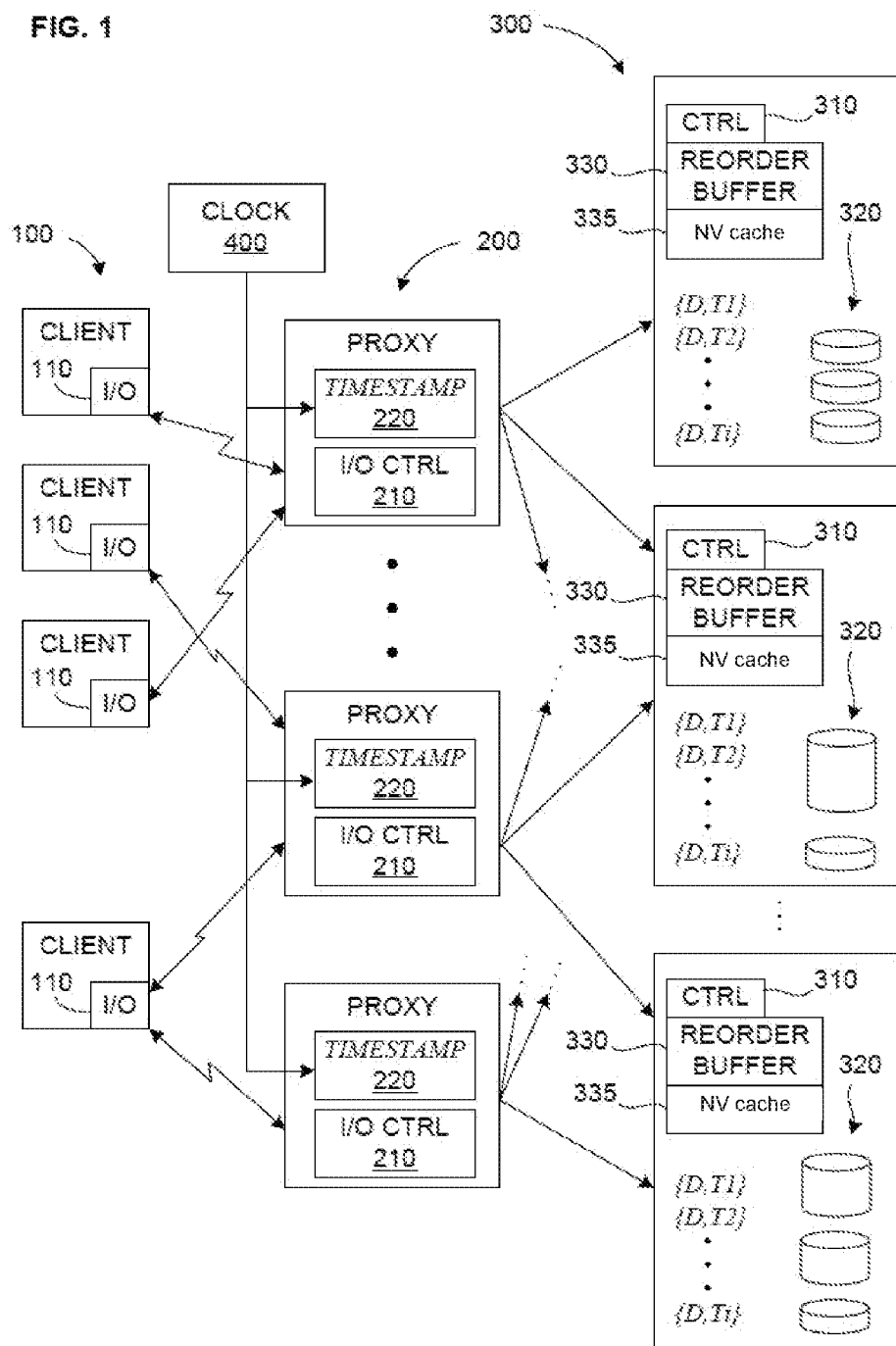
FIG. 1 illustrates an exemplary distributed storage environment wherein writes can be performed while maintaining data storage integrity in accordance with embodiments of this invention.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending," "receiving," "determining," "transmitting," "evaluating," or the like, refer to actions and processes (e.g., the flowcharts of FIGS. 3, 4, 5, 7 and 9) of a computer system or similar electronic computing device or processor. The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Future Write in Distributed System Maintaining Data Storage Integrity

FIG. 1 illustrates an exemplary distributed storage environment of a computer network system wherein write operations, "writes," can be performed while maintaining data storage integrity in accordance with embodiments of this invention. A group of clients 100 submit I/O requests, via one or more proxy servers 200 ("proxies"), which then manage the I/O requests and complete them by addressing one or more storage servers 300. In short, the clients 110 wish to write data to and read data from storage devices 320 in the storage servers 300, and the intermediate proxy servers 200 administer the I/O requests. It is appreciated that each proxy server comprises at least a timestamp module 220 and an I/O control module 210.

All of the illustrated systems—clients, servers, storage servers—will include conventional hardware and software components (not shown, for the sake of simplicity, and because they are well known) such as one or more processors, system software (such as an operating system and/or virtual machine hypervisor, etc.), a network connection device such as a NIC, any necessary user-interface devices and other peripherals, and some combination of memory and storage that holds the executable code that causes the respective processors to carry out the functions described below. The various embodiments of the present invention described here may be embodied in any non-volatile storage medium and may be included as pre-installed components of the various systems, or may be delivered later as a computer program product.

Clients may be any type of hardware or software entity that issues I/O storage requests. In most cases, the I/O requests will be formed and submitted by a client's system software, and may originate from any form of process within a computer (virtualized or not) or from the system software itself for its own needs. Any conventional I/O connection device 110, such as a network interface card, will typically be included to communicate I/O requests to the proxy servers 200. In general, embodiments of the invention do not require any modification of clients. Note that a client could even, for example, be a process within one of the proxy servers. In other words, in some embodiments, the clients may be co-located with the proxy servers 200.

Except for a client that is a process within a proxy server itself, clients will typically communicate with the proxy servers over any conventional public or proprietary network, or any combination of networks. Although it would be a possible design choice, the embodiments of the present invention do not presuppose that any given client will submit its I/O requests only to any specific proxy server(s). Similarly, the proxy servers will typically communicate with the storage servers over any conventional open, public or internal, proprietary network(s), which may be the same network(s) over which the clients communicate with the proxy servers. As is explained further below, the use of real-time clocks in embodiments allow even out-of-band (for example, direct) communication between clients (without them having to do so via the storage system) while still preserving causality.

As FIG. 1 illustrates, each of the storage servers 300 normally include at least one storage controller 310, which will include software components programmed to carry out its tasks. The storage controller is responsible for writing incoming data sets to the actual hardware storage devices 320 (possibly after dividing these sets into smaller units), for reading back data units to be returned to requesting entities, and for establishing and maintaining any needed mappings between the logical and physical address spaces of the devices 320. The storage controllers 310 are also responsible for carrying out any policy that has been programmed into its software for determining the manner or order in which incoming data sets should be written. It is not required by any embodiment of the invention for the proxy servers 200 to be separate from the storage servers 300 themselves, although this is just as possible; rather, a proxy server 200 could be combined with and serve as a storage server 300 as well, in which case the control circuitry and software in the proxy server could also perform the functions of a storage controller 310. Further, as mentioned above, in some embodiments, the client 100 may be co-located with the proxy servers 200.

In one embodiment, the storage system consists of two internal 'layers,' not including the clients. The first layer comprises proxy servers 200 that receive read and write requests from the clients (or applications), forward them to the storage nodes 300 and orchestrate the distributed handling of the requests. The other layer comprises storage nodes 300 that receive requests from the proxies (they typically do not communicate directly with the clients) and respond to the proxies. The proxies and the storage nodes may be 'collocated' in that both the proxy software and the storage node software are independent software processes that may be running on the same computer or in different computers connected by a network.

The storage servers 300 need not, and will normally not, have the same number or even type of physical storage devices 320. For example, within any of the storage servers there may be any combination and number of storage media (such as a Hard Disk Drive HDD), tape drives, a solid-state storage device (SSD), a hybrid SSD device, faster, modern non-volatile media (NVM), etc.

It should be noted that in a distributed storage system such as a scale-out system will typically comprise many more proxies 200 and storage servers 300 than the system illustrated in FIG. 1. Scale-out storage is a network-attached storage (NAS) architecture in which the total amount of disk space can be expanded through the addition of devices in connected arrays with their own resources. In a scale-out system, new hardware can be added and configured as the need arises. When a scale-out system reaches its storage limit, another array can be added to expand the system capacity. Scale-out storage can harness the extra storage added across arrays and also use added devices to increase network storage capacity, adding performance and addressing the need for additional storage.

Further, in a scale-out system, distributed redundancies can be built into the system by having many additional copies of each set of data over several nodes. Creating multiple copies of data at multiple nodes or locations ensures reliability of the distributed storage system. Further, the control module 310 in each storage server can be programmed to failover rapidly from one server to another in case of problems. However, one challenge associated with creating distributed redundancies within the storage system is ensuring that any changes to the data set are replicated across all the various copies consistently so that reads can be performed from any source.

In a typical distributed storage system, clients 100 needing to perform a read or a write from or to the storage servers 300, respectively, will issue the reads and writes to the proxies 200 utilizing a standardized protocol, e.g., iSCSI. For example, if one of the clients needs to perform a write for a data set that is replicated across all three of the storage servers 300 shown in FIG. 1, it can issue a write to a proxy server 200 and the proxy can then distribute the write across the multiple storage servers. A read, on the other hand, can simply be issued by a proxy to a single storage server and, assuming, all the copies of the data set across the three storage servers 300 are consistent, the read can be serviced from a single storage server.

In one embodiment, a write is considered completed by an initiator (e.g., a client) when the client receives a write acknowledgment from the storage system. Once the initiator has received the write acknowledgment, it can assume that the data is persistently saved in the storage system so that only a catastrophic failure (e.g., multi-node hardware failure) can lose the just-written data. Accordingly, if the data is persistently saved, then if the system is brought down or crashes (without sufficient hardware), the data can be read after the crash, unless it has been overwritten by a younger write. Subsequently, any read by the same or any other initiator of that data will either receive the data just written or even younger data (if the same initiator or others are writing). Further, if the original initiator informs a different initiator or client that it has completed the write, the other initiator may then be able to read the data just written or the even younger data.

In one embodiment, the intelligence to distribute reads and writes in accordance with the client's instructions are programmed into the I/O control module 210 of each of the proxy servers 200. In one embodiment, the distributed software programmed into the proxy servers 200 and storage servers 300 (e.g., in the control blocks 310 and the I/O control modules 210) ensures that data is written into all the various copies of a data set correctly and that a read can be performed reliably from any of the multiple copies written.

Each storage server preferably also includes a dedicated non-volatile cache (NVcache)—labeled 335 in FIG. 1—which may be implemented as a dedicated component, or as a dedicated portion of sufficiently fast storage space in one of the storage devices, such as an NVM device. If included, the storage server may use NVcache 335 to store uncommitted data temporarily that, when the corresponding write commits, may be moved to its "proper" place in storage (as will be explained further below). In a typical embodiment, the NVcache 335 will comprise non-volatile storage. The temporary NVcache storage may remain transparent to clients. Note, however, that each data storage node also comprises a 'dumb' (not network aware) storage system where the data is stored persistently, e.g., in storage devices 320. The 'dumb' storage system may also be referred to as local extent data store. Hereinafter, 'dumb storage' is used to refer to storage system within each data storage node that is not network aware and where the data can be stored persistently, e.g., storage devices 320.

Functionally, a storage server 300 may be considered to comprise three main sections or sub-systems: a) a smart section that comprises a network/transactional engine, which includes the controller 310 and reorder buffer 330 (which may be implemented as a single component); b) the NVcache 335; and c) a "passive" or 'dumb storage' section that comprises the storage devices 320. The dumb storage section 320 need not be aware of the network or any storage transactions taking part over the network. The NVcache, in one embodiment, simply carries out the actual read and write operations on whatever medium the storage devices 320 (e.g., the dumb storage system) include. In one embodiment, the NVcache is implemented on very fast non-volatile memory. In a different embodiment, the NVcache may be implemented on a portion of the dumb persistent storage system, however, in typical embodiments, the NVcache is implemented as a separate, dedicated cache using fast non-volatile memory.

In some systems, storage servers operate essentially independently, such that data is written to only one storage server at a time. In other systems, such as those using RAID 1, writes are mirrored, such that copies of the same data are written to more than one storage server, and, in some cases, to all storage servers. In still other systems, such as RAID 0, data, such as containers, are divided into sub-sets and written as stripes over several storage servers. Still other arrangements provide for different types of multiple copies (mirroring) combined with variations of striping, such that data containers may be divided into different types of chunks, which are copied to some but not all storage servers, in varying patterns, often including error-correction chunks. Embodiments of the present invention may be adapted for use with any arrangement of distributed data storage.

A conventional write request coming from a client 100 will typically include not only the data to be written, but also may include some metadata, such as an identifier of the client. In other words, a typical write request will be in the form:

$$D=\{data;metadata;D\_other\}$$

where the "D_other" information will depend on the particular format of the storage system. (Of course, the values of data; metadata and D_other will generally differ for each write request, even for requests from the same process within a single client.)

Figure 2:
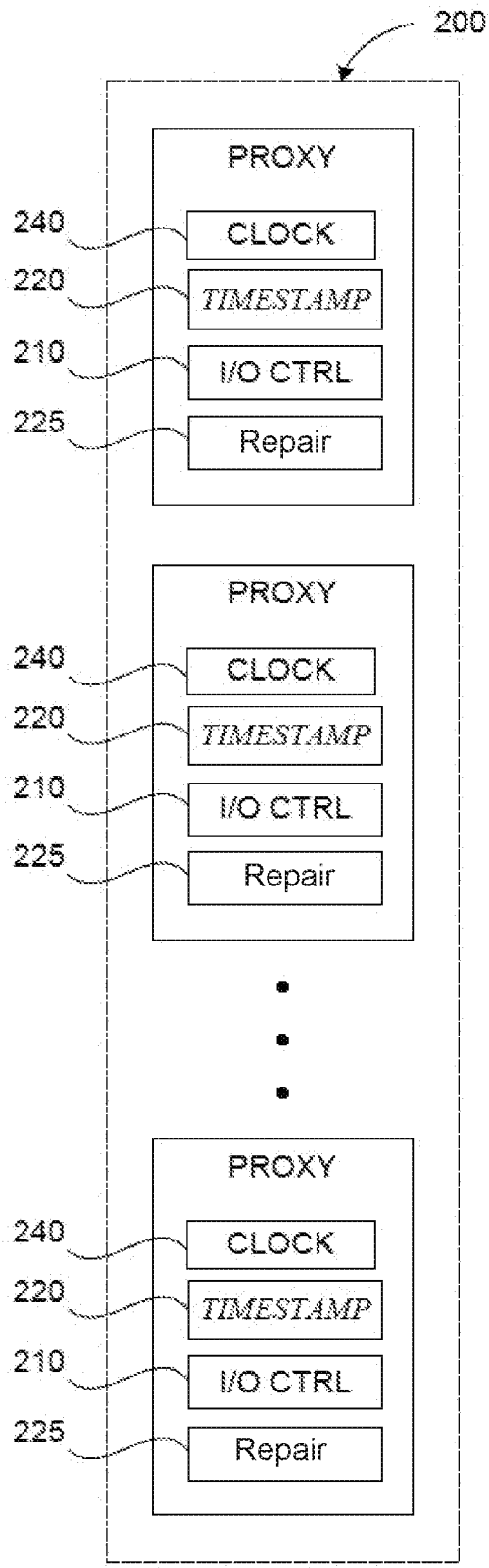
FIG. 2 illustrates some exemplary components of the proxy servers in accordance with an embodiment of the present invention.

FIG. 2 illustrates some exemplary components of the proxy servers in accordance with an embodiment of the present invention. In one embodiment, each of the proxy servers may comprise a clock module 240, a timestamp module 220, an I/O control module 210, and a repair module 225. In embodiments of the present invention, a time-stamping module 220 within each of the proxy servers 200 augment each received write request with an additional parameter, or set of parameters, in particular, a timestamp T, which consists of or includes a physical time value t.

The time value t may be derived either from a single, common physical clock 400, or from synchronized physical clocks 240 within each of the proxy servers 200. For example, the clock 400 may be a dedicated, precise clock used to implement embodiments of the present invention. Unequal propagation times for the time signal would, however, for most configurations of the servers, make it impossible to rely on the "raw" time signal for even the most precise clock if the granularity of the time indication in the timestamps is on the order of nanoseconds, microseconds, or even milliseconds. As shown in FIG. 2, including individual, precise, and initially and periodically synchronized clock circuits 240 within each server may reduce the relative errors, but may be a solution too expensive or impractical for servers controlled by different administrators.

In one embodiment, the selected synchronization method synchronizes the proxies 200 using the well-known Network Time Protocol (NTP), which can typically synchronize all participating computers to within a few milliseconds of Coordinated Universal Time (UTC). NTP-based synchronization may be improved if all the systems to be synchronized are within the same local area network, that is, connected to the same switch. Other, newer network-based protocols, such as the Precision Time Protocol (PTP), may also be used. It would also be possible for the proxies and storage servers to adaptively adjust NTP time in conjunction with the messages already sent back and forth for the data operations.

Other examples of devices suitable to provide a precise time base, that is, to comprise the clock system 400 in accordance with embodiments of the present invention, include GPS receivers, traditional atomic clocks, or new single-chip, and atomic-clock-quality frequency generators, etc. Of course, multiple time sources may be combined and coordinated to improve precision. For example, a GPS receiver may be preferable in some embodiments because GPS receivers are typically inexpensive, they implement a precision time protocol (PTP) that allows for sub-nanosecond synchronization times, and function better than singular atomic clocks because they report a consensus of multiple atomic clocks. It should be noted that embodiments of the present invention may also include other types of time distribution methods that achieve equivalent or better synchronization.

In one embodiment, each write request, when received from clients, may be [re]-formatted within the proxy servers, and sent to the storage servers 300, in the form {D;Ti}, where D is as explained above and Ti={ti; T_other}, where ti is the physical time at which the write request was formed. In one embodiment, one of the T_other parameters included in each Ti is an identifier of the proxy server that is requesting the I/O operation; other parameters might include an ID of the client requesting the I/O operation as well, e.g., the metadata stored as part of D. Note that client and/or proxy IDs may, and often will, be part of the metadata of D, such that it will not be necessary to include this information in the timestamp.

Physical time (e.g., within common physical clock 400 or synchronized physical clocks 240) need not be normal "clock" time (such as UTC), although this is possible, but is rather preferably an index that counts a time unit from any suitable system "epoch" or "time base origin" t0=0000 . . . 0. The preferred time unit may depend on the bit-length resolution with which ti is represented, as well as how short a wrap-around time is allowed for. For example, if the unit of time is nanosecond, and ti is represented as a 64-bit word, then ti will wrap around (return to t0) only after roughly 580 years.

In one embodiment of the present invention, timestamps may be used absolutely as well as relatively, that is, rather than comparing timestamps of different write requests with each other, storage servers may compare single timestamps to some absolute time. Timestamps as generated in embodiments of this invention have other uses as well. For example, software is often upgraded. The timestamp of the data and code stored for a given software package may also serve as an identifier of the currently installed version of the software. Before loading the software, the proxy could check the timestamp, which, if too "old", could indicate a need to update the software to a more recent version.

A) A Standard Method for Performing a Write and Read in a Distributed System that Ensures Consistency and Assures Full-Forward Progress Write Operation As mentioned above, in a typical scale out storage system, data is mirrored across several data storage nodes for reliability reasons. It is, therefore, important to ensure that all the mirrors end up in the same state even when there are multiple writers. Due to network latency or clock skew, for example, write data to be mirrored across multiple locations may arrive at each location at slightly different times. In other words, it is not guaranteed that a write sent out by the client that needs to be replicated across three different storage servers will arrive at each storage server at exactly the same time.

Further, because of network latency, dissimilar processing speeds and server loads, and other potential factors, it is also not guaranteed that multiple write requests made to a storage server will arrive at the storage server in chronological order. (If they did, then there would in general be no conflicts to resolve.) Further, it is possible that overlapping of I/O requests may also happen (where multiple clients, for example, try writing to the same location at the same time or a single client writes to the same location through different pathways concurrently). It is important, therefore, in a distributed storage system to ensure consistency between the multiple write operations from multiple sources.

In order to ensure this consistency, embodiments of the present invention advantageously utilize a reorder buffer 330, which is a data structure implemented on storage servers 300. The reorder buffer is typically stored in Random Access Memory (RAM). Writes are ordered in the reorder buffer 330 based on their respective timestamps.

Each storage server therefore preferably includes the reorder buffer 330, which, depending on its designed size, buffers received I/O requests for some period, such as on the order of seconds. The storage controller 310 in the storage server may then examine the reorder buffer 330 contents in order to review the requests' timestamps. Thereafter, the storage controller services the requests accordingly to avoid causality violations and to ensure that all active storage servers in the cluster have the same data, such that there are no consistency violations to either multiple clients or a single client using multiple connections (multipath).

The reorder buffer, therefore, preferably "reorders" in the sense that it is used to reject "out of time order" writes that may have resulted from, for example, clock drift/skew or other synchronization errors. Note that the better synchronized that the clocks are (and the lower that the processing/network latency is), the fewer rejections will generally occur. Note also that a true causality violation will result in rejection from all storage servers.

Each of the storage servers comprise its own reorder buffer. The reorder buffer is typically a timestamp-ordered data structure that is finite. In one embodiment, the reorder buffer 330 and the NVcache 335 can be programmed to be part of the same module. In a typical embodiment, however, the reorder buffer is stored in volatile memory, e.g., RAM while the NVcache 335 is stored in non-volatile storage and is associated with the reorder buffer. It is preferable for NVcache 335 to comprise persistent storage in case of a shutdown or a restart, the data associated with the entries in the reorder buffer are not lost.

The reorder buffer extends a finite amount of time into the past and a finite amount of time into the future. For example, it may extend 2 seconds into the past and 1 second into the future. The reorder buffer can extend into the future for situations in which because of clock skew, a request received by the storage server from a proxy may appear to be in the future. For example, if the clock on a first proxy sending a request is slightly ahead of a second proxy also sending a request, and propagation delays are small enough, the request from the first proxy can arrive at the storage server appearing to be in the future. Accordingly, the reorder buffer window can be designed such that it includes the current time (as reported by clock 400 or clocks 240), but also includes a delta of time in the future to tolerate the case of bounded clock skew.

All write requests that arrive at a storage node 300 are augmented with a timestamp (assigned by the proxy servers 200). Timestamps can be ordered (e.g. by concatenating a true timestamp and a node/thread ID that makes them unique in the case of simultaneous actions on different nodes/threads). Any request that arrives outside of the current time window (defined for the reorder buffer) is rejected as invalid by the reorder buffer 330. Any request that arrives within the current time window of the reorder buffer 330 is accepted. As explained above, the reorder buffer extends in time to tolerate clock skew/drift and network delay. The extension of the reorder buffer in each direction (past and future) typically is large enough to tolerate maximum effective skew and maximum network propagation time (past) and maximum effective skew and minimum propagation time (future). Therefore, any write arriving outside of the window is classified as invalid.

Any known data structure may be used to implement the reorder buffer, depending on well-known considerations such as the minimum expected size needed, ease of changes, etc. For example if it is to hold only a predetermined number of entries, with older ones being overwritten, then a circular buffer may be appropriate. To provide flexibility on size, however, a non-circular, FIFO linked list might be preferred in some embodiments.

In one embodiment, the reorder buffer is configured to be deep enough to accommodate the maximum timestamp skew between the proxies, and the maximum tolerable network delay for a request. Using known methods, the expected I/O throughput, that is, the request-per-time unit, can be measured or estimated. This may be done statically (especially for fixed-size reorder buffers), in advance by a system administrator or designer, or dynamically (for adjustable-size reorder buffers), by including code in the storage servers' controllers 310 or as part of the reorder buffer itself to periodically measure the frequency of incoming requests. The size can be programmable and set from a remote administrator device.

The total client-to-storage server delay can then be estimated using known methods, for example, by measuring and/or estimating the maximum clock skew between the proxies 200, plus the maximum tolerable network delay for a message (request). For example, if the maximum clock skew between the proxies is 10 microseconds, and the maximum tolerable delay for a message is 100 microseconds, the reorder buffer would preferably keep track of at least the last 110 microseconds worth of operations.

As an alternative, the system designer may simply choose the depth of the reorder buffer using other factors. The tradeoff will be that a reorder buffer that is too small may cause an unacceptable number of write requests to be rejected as being too old, whereas a reorder buffer that is too large will require correspondingly larger space and search times. Note that the smaller the clock skew, the smaller the reorder buffer may be without negative impact. Accordingly, the more precise the real-time clocks 400 or 240 can be designed, the smaller the reorder buffer can be without negative impact.

Note that the reorder buffer 330 needs to keep track only of the transaction information, not the data itself, which can be written to NVcache 335. Accordingly, the reorder buffer needs to be designed in a way such that the controller 310 can easily determine the relative timestamp-based order of identified entries so as to be able to determine whether one version of an entry is more or less recent than another. The reorder buffer may be used by the controller 310 to reject out-of-order writes (and write-like operations); hence, only the metadata is necessary. As will be explained further below, any write that has a timestamp older than the past time limit of the reorder buffer (or the 'past' boundary of the reorder buffer) is preferably rejected as too old even if it does not overlap with any other writes in the reorder buffer.

Figure 3:
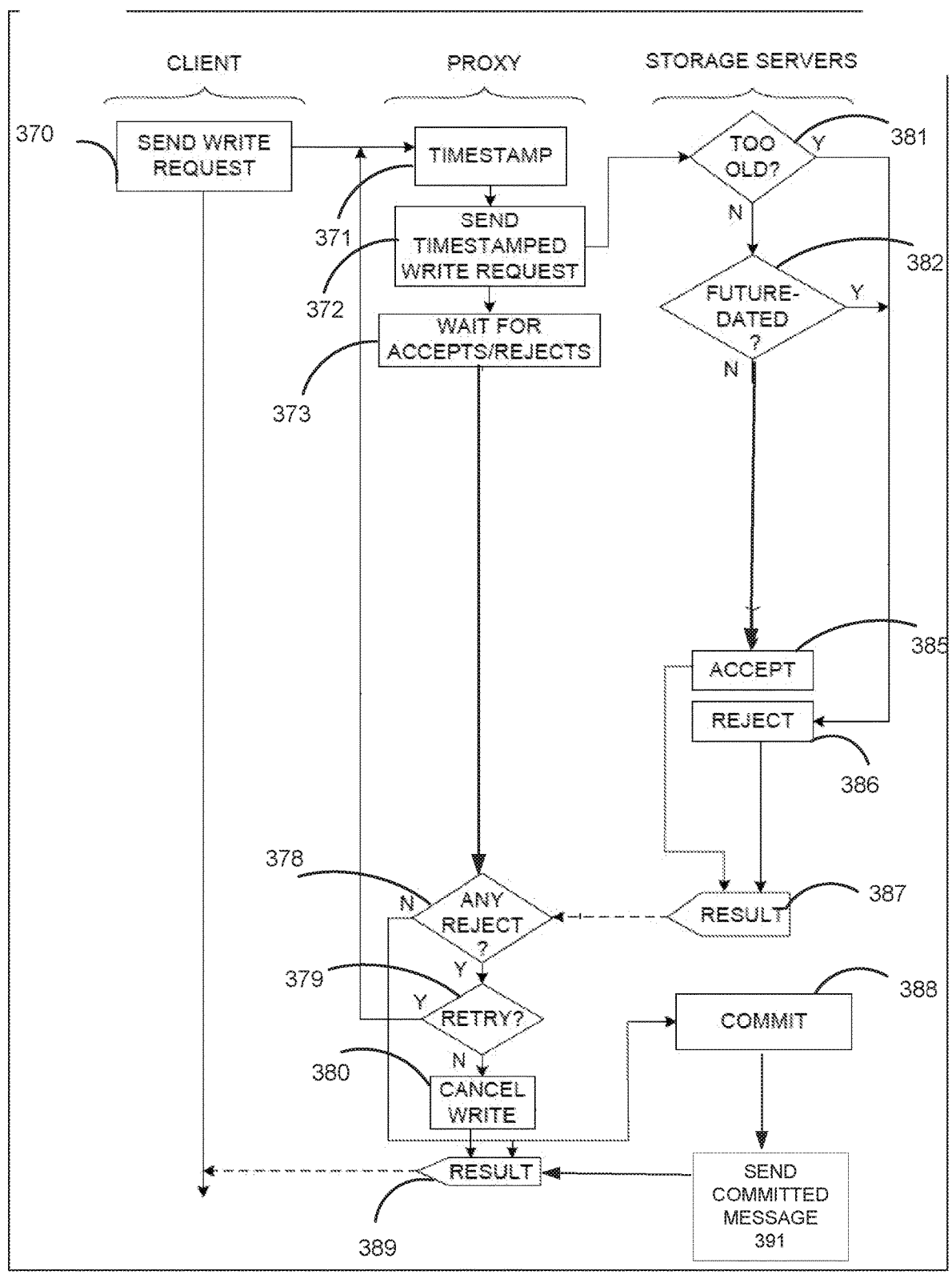
FIG. 3 depicts a flowchart illustrating the main computer implemented processing steps for a standard write operation that ensures consistency and full-forward progress in accordance with an embodiment of the present invention.

FIG. 3 depicts a flowchart illustrating the main computer implemented processing steps for a standard write operation that ensures consistency and full-forward progress in accordance with an embodiment of the present invention.

A client 100 sends a write request to a proxy server 200 at step 370. The proxy augments the write request with a timestamp at step 371 and forwards it to the relevant storage servers 300 at step 372 (e.g., the same write request may be transmitted to multiple storage servers). The proxy then waits for an accept or reject from the storage servers at step 373.

Each storage server checks the write request for a valid timestamp at steps 381 and 382. By examining the reorder buffer 330 and/or NVcache 335, each storage server may first determine if the request falls within temporal bounds, that is, whether it is older than the oldest limit of the buffer, and whether it corresponds to a time in the future. In other words, the controller 310 in the storage server checks to see if the incoming request is out of the reorder buffer time window. This can be due to incorrect synchronization of the nodes or, more rarely, due to excessive processing/network delay. If the timestamp is invalid (e.g., if it is too old or too new), the write is rejected at step 386. If the timestamp is valid, then the write request is accepted at step 385 and inserted into the reorder buffer in timestamp order.

At step 387, the result of whether the write request was accepted or rejected is reported back to the proxy server. The proxy collects the responses from all the relevant storage nodes the request was sent to and, at step 378, determines if any of the storage servers rejected the write. If any of the servers rejected the write, the proxy server sends an abort to all the relevant storage nodes and then retries the write request with a new (younger) timestamp at step 379. If the retry is unsuccessful, then, in one embodiment, the write may be canceled at step 380 and reported back to the client at step 389. If there are no rejects reported from any of the storage servers, the proxy sends a commit message to all the storage nodes at step 388.

If a storage server receives an abort, it deletes the write request from its reorder buffer. On the other hand, if it receives a commit from the proxy, the storage server marks the request as committed in the reorder buffer. The storage server continually drains committed requests from the reorder buffer in timestamp order. Requests can only be drained if they are committed and their timestamp is such that any write request with an older timestamp would be rejected as invalid. For example, if the reorder buffer is '2 seconds long', then requests are drained only when they are committed and at least 2 seconds old. Draining occurs in order. Note that there are two steps typically in removing a request from the reorder buffer. First, the data is written into the underlying 'dumb' persistent storage system. This can be done at any time after the request is committed and all overlapping writes with older timestamps have either been aborted or written to the dumb persistent storage. (The storage for the data in the NVCache can be reclaimed once the data has been successfully written to the dumb storage system). Secondly, the request meta-data is removed from the reorder buffer. For an aborted write, this can be done immediately upon receipt of the abort message and the corresponding storage for the data in NVCache can be removed and reclaimed at the same time. For a committed write, this is done once the timestamp for the write ages out of the reorder buffer (e.g., is at least 2 seconds old if the reorder buffer extends 2 seconds into the past). Whenever the write meta-data is removed from the reorder buffer, its storage in the reorder buffer can be reclaimed. Further note that, in one embodiment, the dumb storage system records and remembers timestamps and sorts by timestamp so that in fact it may be appropriate to drain 'out of order' from the re-order buffer and the dumb storage system will always keep the write with the youngest timestamp and ignore an overwrite with an older timestamp.

When a storage server drains a committed write request to the underlying storage system (e.g., the 'dumb' storage system), it sends a committed message back to the proxy at step 391. The proxy then collects all the 'committed' messages from all the relevant storage servers and, after they are all received, transmits the write acknowledgment to the client (or initiator) at step 389. Note that a client only receives a write once all the servers have sent a 'committed' message to the proxy, and the storage nodes only send that once they have drained a write to the underlying 'dumb' storage system, where it can be read back by a read operation.

It should further be noted that in the embodiment discussed in connection with FIG. 3, rejections occur only due to requests arriving out of the reorder buffer time window. There are no rejections due to conflicts where multiple proxies are trying to write to the same block (due to either multiple clients or a single client using multiple connections). The reorder buffer does not check for overlap of requests as it drains the requests in timestamp order. In other words, even if overlap exists, because requests are drained in timestamp order, the conflict is resolved by ensuring that the youngest (or most recent) request is the last one drained out of the reorder buffer. If processing/network delay is not excessive and synchronization between the nodes is successful, rejection will typically not occur in the embodiment discussed in connection with FIG. 3.

The protocol discussed in connection with FIG. 3 involves four main communication legs (excluding the two legs involving the client). The four legs comprise: a) write request from proxy to storage server; b) an accept from the storage server to proxy; c) a commit from the proxy to the storage server and d) a 'committed' message back from the server to the proxy. Accordingly, the write latency in the protocol comprises the processing time and network propagation delay for the various messages in the four-way internal handshake and also the maximum duration in the reorder buffer (e.g., 2+1 seconds where the reorder buffer extends 2 seconds into the past and 1 second into the future).

Read Operation

Figure 4:
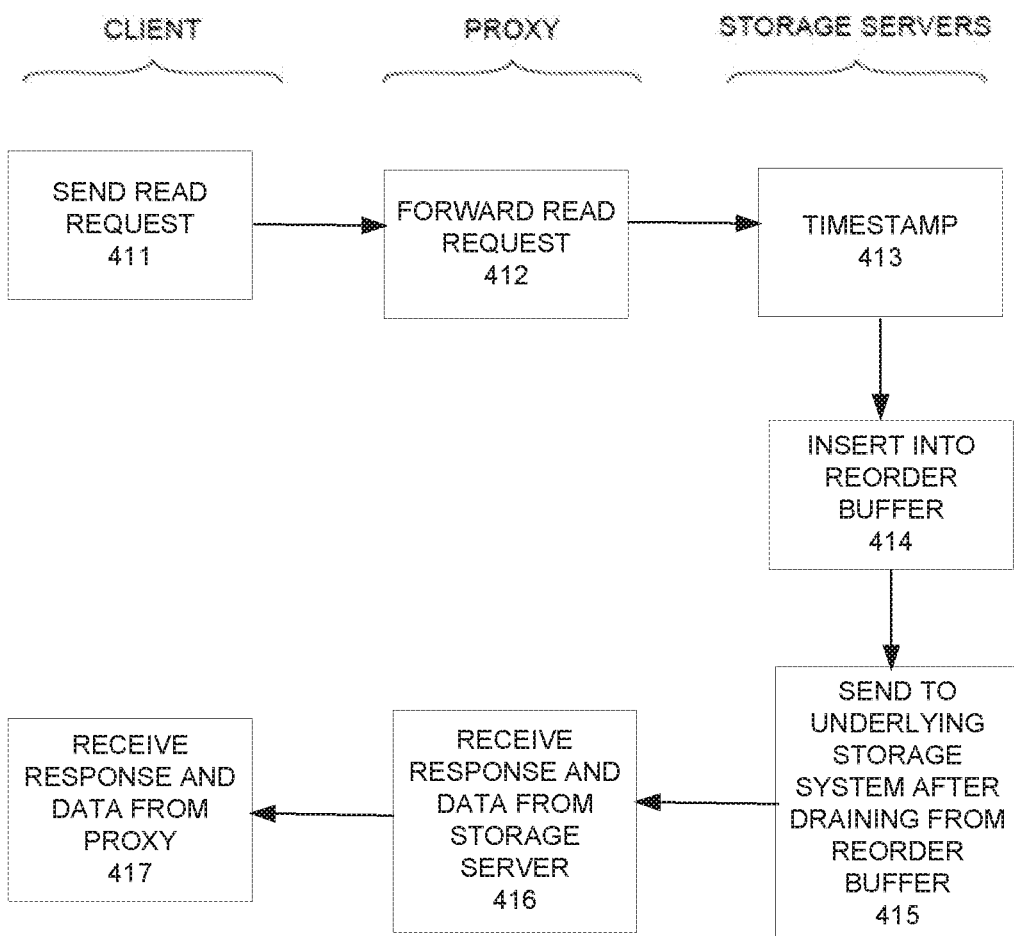
FIG. 4 depicts a flowchart illustrating the main computer implemented processing steps for a standard read operation for a storage system using the write operation illustrated in FIG. 3 in accordance with an embodiment of the present invention.

FIG. 4 depicts a flowchart illustrating the main computer implemented processing steps for a standard read operation for a storage system using the write operation illustrated in FIG. 3 in accordance with an embodiment of the present invention.

At step 411, a client (initiator) 100 sends a read request to a proxy 200. The proxy forwards the read request to a data storage server 300 at step 412. Note that the proxy does not augment the read request with a time stamp.

At step 413, the controller 310 in the storage server (instead of the proxy) augments the request with the current timestamp. Subsequently, at step 414, the controller 310 inserts the request into the reorder buffer in timestamp order and marks it as 'committed.'

When the read request has drained from the reorder buffer in timestamp order (after all older read and write requests have drained and the current read request is old enough), it is sent to the underlying 'dumb' storage system. Once a response or confirmation is received from the underlying storage system, a response and accompanying read data are sent to the proxy at step 416. Thereafter, upon receipt of the response, the proxy forwards the data to the client at step 417.

Note, that there are no retries in the read protocol illustrated in FIG. 4 because the timestamp for a read is assigned by the data storage node 300 and always falls within the reorder buffer bounds.

Excluding the 2 communication legs involving the client, the read protocol comprises two main communication legs: a) a read request from the proxy to the storage server; and b) a response from the storage server to the proxy. Accordingly, the read latency comprises the usual elements (e.g., processing time, network propagation time for the various messages in the 2-way internal handshake) plus the maximum 'past' duration of the reorder buffer (e.g., 2 seconds in the example discussed above).

In one embodiment, for both the write operation discussed in FIG. 3 and the read operation discussed in FIG. 4, the reorder buffer is drained in complete order. However, certain optimizations can be made that expedite read and certain write operations. For example, in one embodiment, read operations can be allowed to drain in parallel with other reads because they do not interfere with each other in the underlying storage system. Further, in another embodiment, non-overlapping writes can also drain in parallel with other non-overlapping writes because they too do not interfere with each other in the underlying storage system. However, overlapping writes, or reads and writes that overlap, both must be drained in order to avoid having them race in the underlying storage system.

It should be noted that the process for the standard writes explained above has retries but they occur only when there is a failure of synchronization or excessive processing/network delay. If synchronization is successful and the reorder buffer bounds have been calculated generously enough, there should be no retries in the write process of FIG. 3. Accordingly, the write process of FIG. 3 does not suffer from any forward-progress issues. In other words, the forward progress of the system is never stunted as a result of repeated conflicts or repeated retries.

One of the special circumstances, however, of the protocol for performing standard writes as described in FIG. 3 and standard reads as described in FIG. 4 comes about in networks having high latency. For example, the proxy server only sends a write acknowledgment to a client once the data storage nodes have drained the write. Further, the data storage nodes need to wait for the request to 'age out' of the reorder buffer before draining it. This adds latency to the system. In addition, reads are also required to 'age out' of the reorder buffer, thereby, also adding additional latency.

This is particularly onerous where conflicts are few, especially, if higher-level software (in the clients) have arranged for writes not to race with each other (e.g. by using locks, or 'statically' partitioning the storage space so that different clients write to non-overlapping regions).

Embodiments of the present invention optimize the read and write operations of the storage system to avoid needing to 'age out' read and write requests out of the reorder buffer.

Further, embodiments of the present invention avoid the extra latency associated with the last two legs of the 4-way internal handshake in the case of writes (e.g., commit from proxy to storage server and 'committed' message from storage server to proxy).

Figure 5:
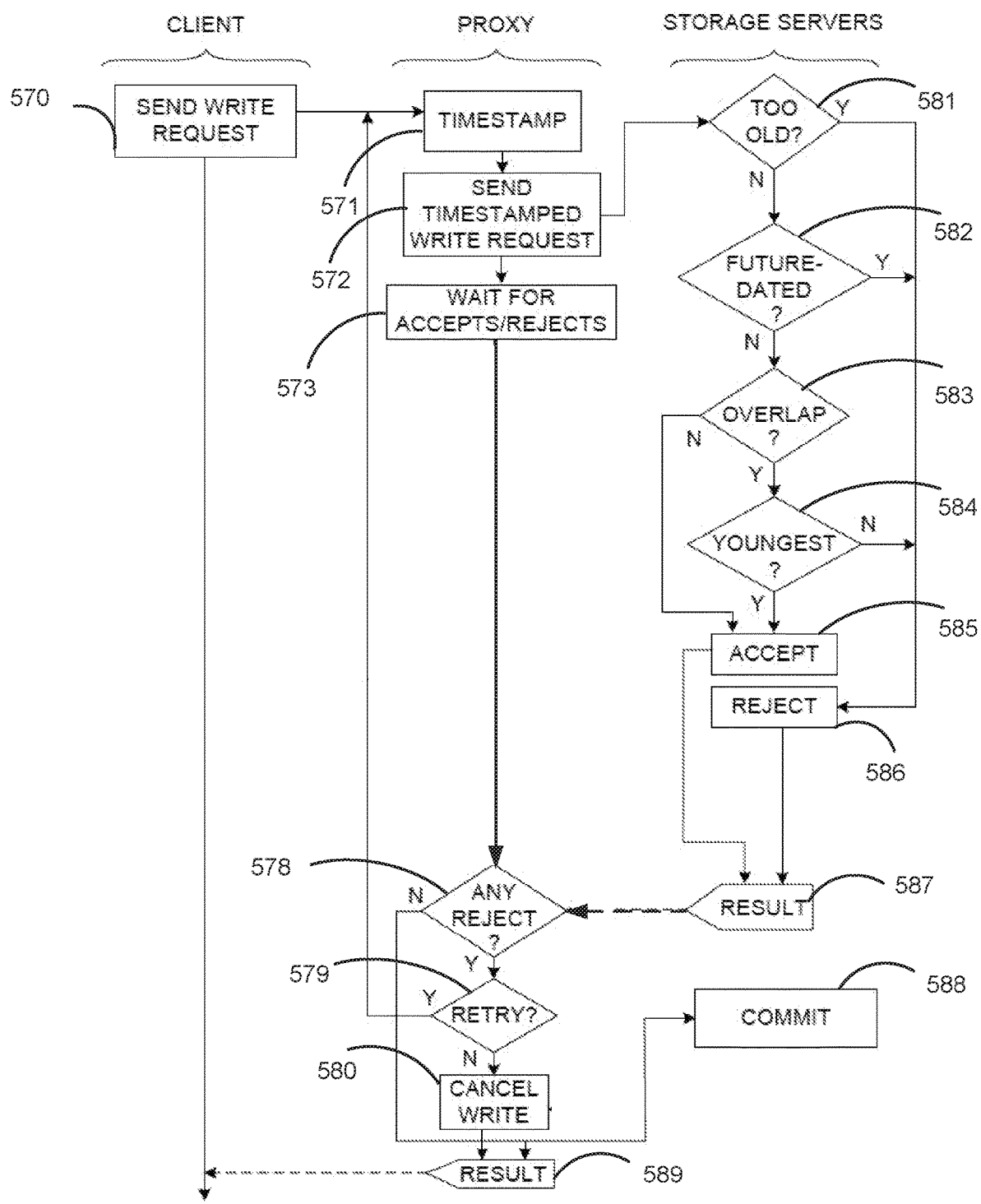
FIG. 5 depicts a flowchart illustrating the main computer implemented processing steps for an enhanced write operation in a distributed storage system that ensures consistency and low latency in accordance with an embodiment of the present invention.
Figure 7:
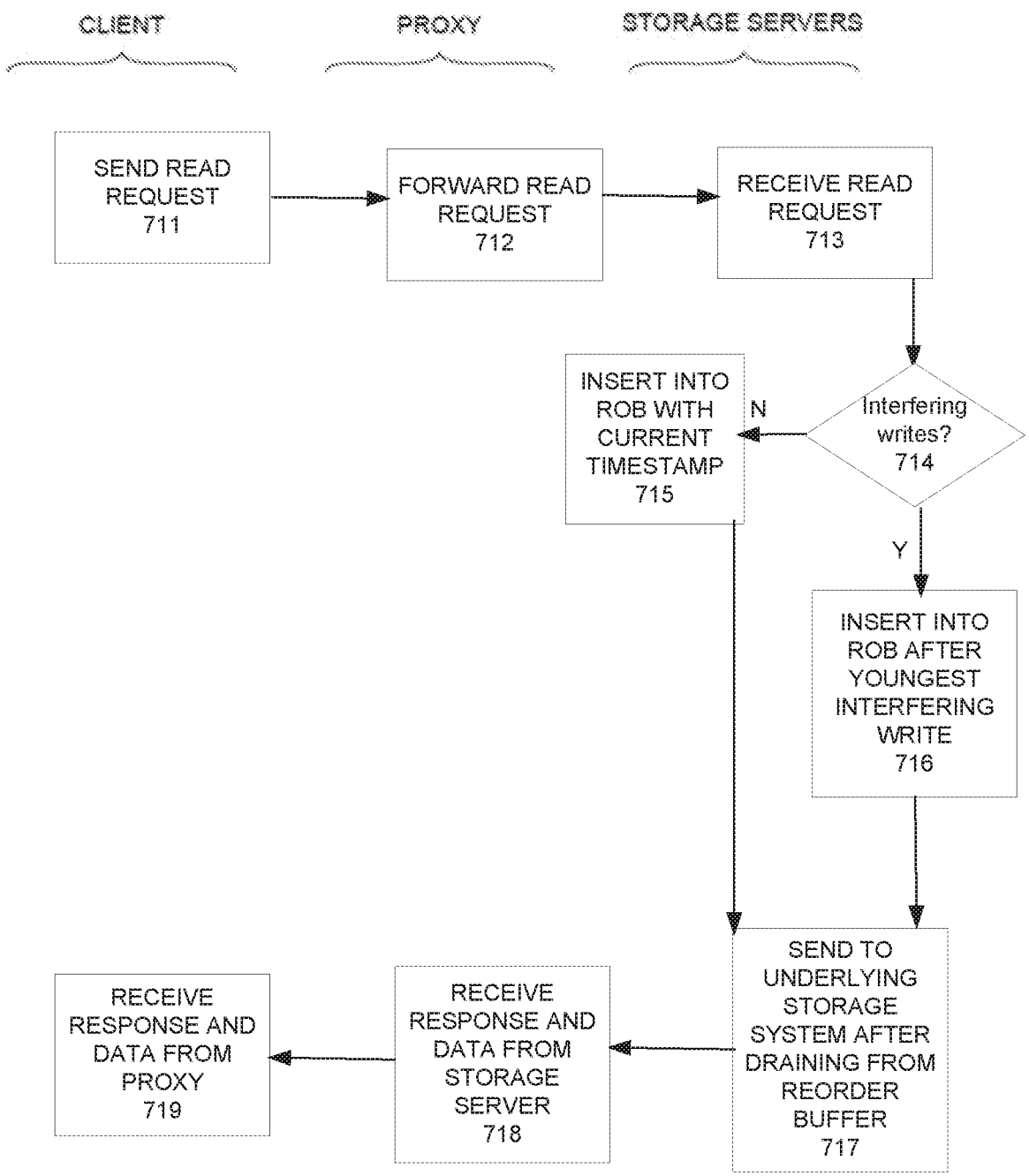
FIG. 7 depicts a flowchart illustrating the main computer implemented processing steps for a read operation for a distributed storage system using the enhanced write operation illustrated in FIG. 5 in accordance with an embodiment of the present invention.

B) An Enhanced Method for Performing a Write and Read in a Distributed System that Ensures Consistency and Low Latency Write Operation FIG. 5 depicts a flowchart illustrating the main computer implemented processing steps for an enhanced write operation in a distributed storage system that ensures consistency and low latency in accordance with an embodiment of the present invention. The write operation discussed in connection with FIG. 5 mitigates the latency associated with the write operations of FIG. 3 (namely, the latency due to the requirement of 'aging out' both read and write requests and the latency from the last two legs of the 4-way internal handshake for write operations). As will be explained in detail below, the enhanced process of performing writes and reads (as shown in FIGS. 5 and 7) removes the latency components at the expense of introducing retries when there are conflicts.

A client 100 sends a write request to a proxy server 200 at step 570. The proxy augments the write request with a timestamp at step 571 and forwards it to the relevant storage servers 300 at step 572 (e.g., the same write request may be transmitted to multiple storage servers). The proxy then waits for an accept or reject from the storage servers at step 573.

Each storage server checks the write request for a valid timestamp at steps 581 and 582. By examining the reorder buffer 330 and/or NVcache 335, each storage server may first determine if the request falls within temporal bounds. In other words, the controller 310 in the storage server checks to see if the incoming request is out of the reorder buffer time window. If the timestamp is invalid (because it is found to be too old at step 581 or too far into the future at step 582), the write is rejected at step 586.

If the timestamp is not outside the reorder buffer window, then at step 583, the controller 310 checks the write to determine if it overlaps with other requests in the reorder buffer. If there is no overlap found at step 583, the new write request is accepted at step 585 and inserted in the reorder buffer and an accept is sent to the proxy by each reorder buffer satisfying the above.

If the new request interferes with another write (e.g. overlaps with another write) then, at step 584, the controller 310 compares the timestamp of the new request with the other write that was already in the reorder buffer. If the newly incoming write is not the most recent (youngest), it is rejected; if it is, it may be accepted. In other words, if the new request has an older timestamp than the write it interferes with, the new request is rejected at step 586 and a reject message is sent to the proxy. However, if the new request has a younger timestamp compared to the other write that was already in the reorder buffer, then the new request is accepted and simply inserted into the reorder buffer in timestamp order at step 585 and an accept is relayed to the proxy server.

The proxy server, meanwhile, waits for accepts and rejects sent from the multiple storage servers at step 573. If all the storage servers each responded with an accept, the proxy will proceed to commit the write to all of the storage servers.

It should be noted, however, that if the proxy receives a reject from any of the servers at step 578, then the proxy will cancel or abort the write request (for example, at step 580) to all the servers and retry the write with a new timestamp at step 579. In other words, the proxy collects responses from all the relevant storage nodes and if any server rejected the write, the proxy sends an abort (relating to the write) to the relevant storage nodes and repeats the write sequence with a new timestamp (at step 571).

Note that, in one embodiment, the write is re-tried with a new timestamp only if all the servers reject the write. In this embodiment, if some of the servers reject the write, then the inconsistency can be resolved simply by keeping the writes in the reorder buffer (for all the servers including the ones rejecting the write) and processing them in timestamp order (instead of retrying the write with a new timestamp).

If all storage servers accepted the write, then importantly the proxy server can, in parallel, send the write acknowledgment to the client at step 589 and a commit message to all the relevant storage nodes at step 588. In one embodiment, a proxy could send a write acknowledgement to the respective client as soon as the proxy receives corresponding accepts from all the storage servers, without waiting for the storage servers to be told that their write has committed. Thus, in the common no-conflict case, there would be no delay in processing as seen by the client and any additional delay would be hidden in the distributed storage system.

On an abort, each storage server (to which the write request is sent) deletes the write request from the reorder buffer.

On a commit from the proxy (at step 588), the storage server marks the request as committed in the reorder buffer and, if there are no older interfering writes in the reorder buffer, it drains it to the underlying 'dumb' storage system. As noted above, prior to the commit, the data associated with the write can be stored in the NVcache 335. If there are interfering older writes, it waits for all of those to be deleted (if they are to be aborted) or drained (if they have already been committed) until there are no older interfering writes and then drains the committed write to the underlying storage system. It should be noted that unlike the write procedure of FIG. 3, no message is sent to the proxy when a write is drained. In other words, there is no 'committed' message returned back to the proxy (unlike the write process illustrated in FIG. 3).

In one embodiment, the controller 310 in the storage server retains a record in the reorder buffer of the committed write including its timestamp and bounds (reorder buffer bounds associated with the write request). The record need only be retained in the reorder buffer until it is 'aged out,' or, in other words, until its timestamp is old enough that any write request with an even older timestamp would be summarily rejected as being too old. The record is necessary so that in the unlikely scenario a new write request arrives with an older stamp, it is not accidentally accepted into the reorder buffer.

The write method illustrated in FIG. 5 advantageously reduces latency, because unlike the write procedure of FIG. 3, the internal communication comprises three legs (as compared with four legs for the write of FIG. 3). The three legs of the write process (absent retries and absent the two legs involving the client) of FIG. 5 are as follows: a) a write request from the proxy to the storage servers; b) an accept response from the storage servers to the proxy; and c) a commit message from the proxy to the storage servers.

Ostensibly, there is no requirement of needing to 'age out' write requests out of the reorder buffer before the proxy can send the write acknowledgment to the client at step 589. The write requests can be sent to the underlying storage system as soon as they are committed and all their write-after-write (and write-after-read) hazards are satisfied (in other words, all cases of overlap have been reconciled). A record (e.g. metadata) is retained in the reorder buffer and is aged out. This record prevents newer interfering (e.g. overlapping) writes with older timestamps from being accepted. Accordingly, the enhanced write process of FIG. 5 advantageously reduces significant latency in the system.

In one embodiment, the actual data to be written can be advantageously sent to the underlying 'dumb' storage system even earlier, when the write request is received by the storage server 300 as long as it is placed in a 'temporary location,' e.g., the NVcache 335. The actual data is then moved when the write is committed and any hazards are satisfied or deleted when the write is aborted. Thus, in this embodiment, at the expense of adding some complexity to the processes of both reads and writes, the data can proceed to the underlying storage nodes as early as it is received by the storage node (which reduces latency significantly as compared with the write and read processes illustrated in FIGS. 3 and 4 respectively).

Note that in the write process of FIG. 5, in addition to performing retries as a result of a write arriving outside of the reorder buffer bounds (which is arguably rare if node synchronization has been performed effectively and the reorder buffer bounds are suitably calculated), writes can also be retried because they conflict (e.g., are overlapping) with a write that arrived at a storage node earlier and has a younger timestamp (as illustrated by steps 583, 584, 585, 587, 578, and 579 in FIG. 5). This situation can be a result of clock skew/drift or different network propagation delay.

The rejection and retry method (as illustrated by steps 583, 584, 585, 587, 578, and 579 in FIG. 5) advantageously guarantees consistency amongst the storage servers because all the storage servers agree on the order of writes that interfere. The storage servers all agree on the order due to the fact that any 'out of order' write will be rejected and aborted from all storage servers. Further, external consistency is also guaranteed amongst the clients even if they communicate with each other outside of the storage system.

Embodiments of the present invention have advantages over such "quantized" storage coordination methods as those that use locks or tokens. In particular, embodiments of the present invention are able to resolve potentially overlapping write requests with no need for proxy-to-proxy or storage server-to-storage server communication, and no need for a supervisory system to administer locks or issue tokens. Even so, embodiments of the present invention are able to coordinate write requests with a performance loss only in the unusual cases of near-simultaneous writes or causality violations.

Embodiments of the present invention do not require the entire system to operate without locks, however. Note in particular, that in some cases the clients may be using locks of their own to "statically" partition the storage system so that writes do not conflict. In such situations, where the clients are already effectively coordinating amongst themselves, there may be no actual conflicts by the time the write requests arrive at the storage system, such that additional locks or tokens in the storage system are unnecessary and the associated overhead can be avoided.

Figure 6:
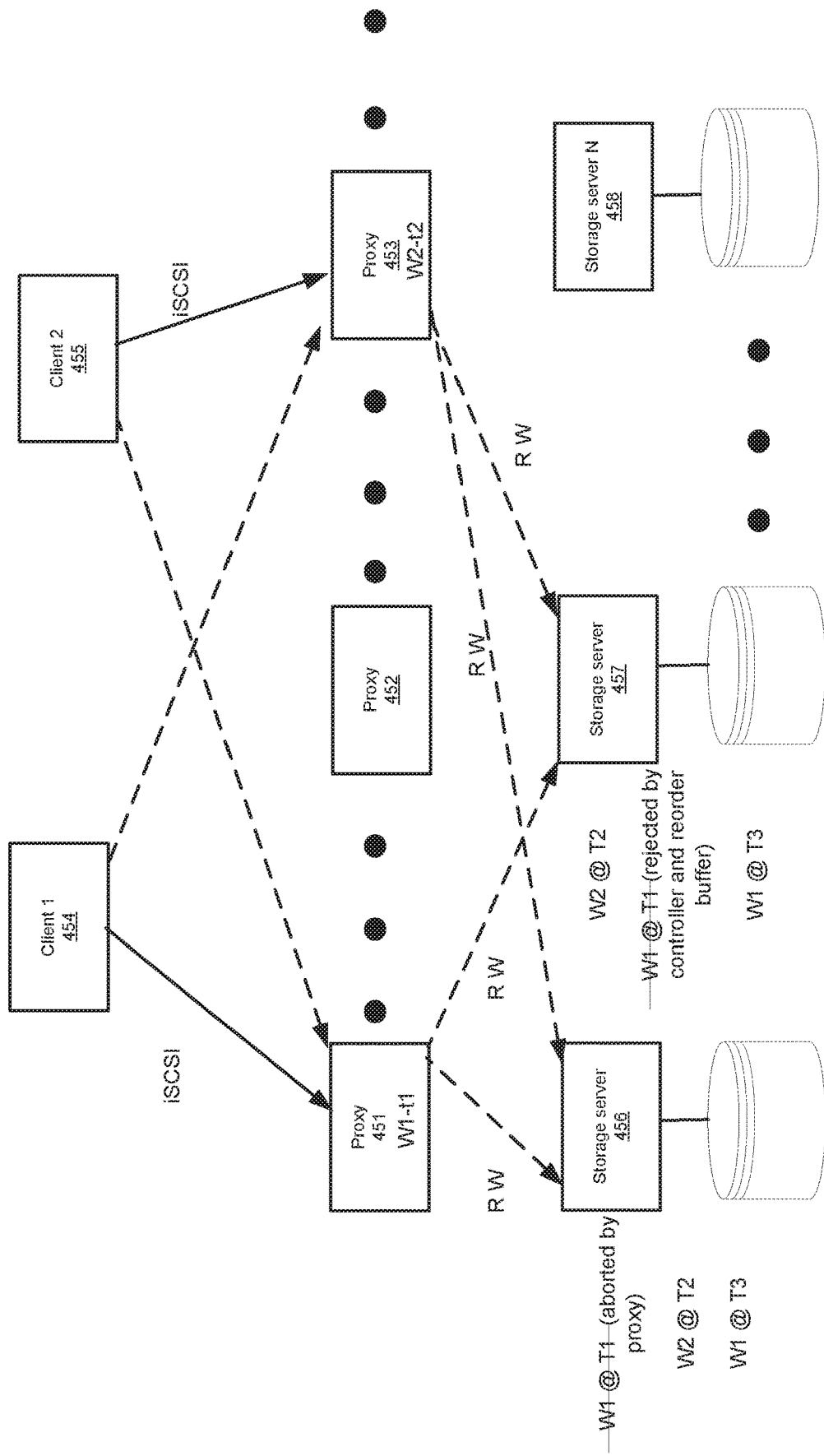
FIG. 6 is a block diagram of an exemplary distributed computer implemented storage system that uses the write process illustrated in FIG. 5 to perform writes in a consistent manner accordance with an embodiment of the present invention.

FIG. 6 is a block diagram of an exemplary distributed computer implemented storage system that uses the write process illustrated in FIG. 5 to perform writes in a consistent manner accordance with an embodiment of the present invention.

FIG. 6 illustrates two clients, Client 1 454 and Client 2 455 capable of writing to one of several storage servers (e.g., storage server 456, storage server 457 or storage server 458) using intermediate proxy servers (e.g., Proxy 451, Proxy 452, and Proxy 453). In one embodiment, the clients may be using an iSCSI protocol. The clients submit I/O requests, via one or more proxy servers, which then manage the I/O requests and complete them by addressing one or more storage servers. In other words, the clients wish to write data to and read data from storage devices in the storage servers, and the intermediate proxy servers administer the I/O requests. It should be noted that while the example of FIG. 6 only uses a finite number of clients, proxies and storage servers, the example is equally applicable in a scale-out system comprising potentially hundreds of clients and servers.

As mentioned above, while reads are typically straightforward, writes can get more problematic if there is a multi-path problem or a shared piece of storage between multiple clients. For instance, in the example of FIG. 6, both clients 454 and 455 may be attempting to perform writes on storage servers 456 and 457, where the writes overlap with each other. In other words, both clients may be attempting to write to the same storage location in the storage servers. This is a common problem in a scale-out system, where one client may be attempting to perform a write that is replicated across one or more additional servers but encounters an interfering write from another client that is also attempting to write to the same location on one or more of the storage servers at the same time.

For example, the write request for Client 1 (W1 at time T1) is processed through proxy 451, which then transmits the write request to storage servers 456 and 457. At the same time, the write request for Client 2 (W2 at time T2) is processed through proxy 453, which then transmits the write request (accessing the same storage location as W1) to storage servers 456 and 457. Note that even though T1 and T2 may be relatively close to each other, T2 is a younger timestamp than T1 (in other words, T2 is slightly later in time than T1).

It may be the case that W1 with timestamp T1 (assigned by proxy 451) arrives at storage server 456 before W2 with timestamp T2 (assigned by proxy 453). Meanwhile, because of clock skew or network delay, W2 with timestamp T2 arrives earlier than W1 with timestamp T1 at storage server 457 (for example, if proxy server 453 is in closer proximity to storage node 457 as compared with proxy 451). This is problematic because the storage server system cannot use arrival order to resolve this conflict. If arrival order is used, then storage server 456 would end up with W2 in the final storage location within the underlying storage while storage server 457 would end up with W1 in the final storage location. This would cause inconsistencies in the system and the client would not be guaranteed to read out the same data between storage servers 456 and 457.

Note that a similar problem may also result because of the same client writing to the same location through multiple paths (as a result of, for example, network congestion or temporary disconnection from one of the proxy servers). For example, client 1 454 may attempt to write to the same storage location on storage servers 456 and 457 through both proxy 451 and proxy 453. Whether the conflicting writes are being transmitted by the same client or two different clients does not make a difference in terms of how the write process illustrated in FIG. 5 resolves the overlapping write requests. In other words, from the perspective of the distributed storage system (e.g., the proxy servers 200 and the storage servers 300), the problem of multiple writers and multiple paths for the same writer are identical.

It is apparent that embodiments of the present invention resolve the conflict by using the 'rejection and retry' mechanism discussed in connection with FIG. 5. When W1 with timestamp T1 arrives at storage server 456, assuming that T1 is not outside the bounds of the reorder buffer of storage 456, it is accepted because there are no overlapping writes found in the reorder buffer of storage 456. W1 is then inserted into the reorder buffer of storage server 456 and an accept response is sent to proxy 451. Similarly, when W2 with timestamp T2 is received at storage server 456, the storage server 456 checks the write against other requests in the reorder buffer. Because W1 is identified as an overlapping write that already exists in the reorder buffer, the controller 310 of the storage server determines if W2 has a younger timestamp. Because W2 has a younger timestamp, it is accepted and also inserted into the reorder buffer. Further, an accept response is sent to proxy 453 that W2 has been accepted.

Meanwhile, as mentioned above, because of network delay or clock skew, it may be the case that W2 with timestamp T2 arrives at storage server 457 from proxy 453 earlier than W1. When W2 arrives, the same procedure is followed as illustrated by steps 581 to 586 of FIG. 5. Assuming that W2 is within the bounds of the reorder buffer of storage server 457 and that there are no other overlapping writes in the reorder buffer, W2 with timestamp T2 is accepted and inserted into the reorder buffer. Subsequently, when W1 at timestamp T1 arrives from proxy 451, it runs into a conflict because it has an older timestamp than W2. Accordingly, storage server 457 has to reject W1 with timestamp T1. Both the acceptance of W2 and the rejection of W1 are reported to the respective proxies.

Proxy 451 receives the rejection from storage server 457 for W1 and, in response, sends an abort to storage server 456 regarding W1. The storage server has to, therefore, delete W1 from its reorder buffer. Subsequently, proxy 451 has to assign W1 a new younger timestamp T3 and retry the write request for W1. Note that, in one embodiment, the data associated with W1 could remain in the NVcache 335 for the storage servers while the W1 write is attempted again. In other words, the data for W1 does not need to be retransmitted; a new timestamp (e.g. a new younger timestamp T3) gets assigned to W1 and associated with the data that is already in NVcache 335 from the prior attempt. Stated differently, when W1 is re-tried with timestamp T3, the data for the write request is already in the NVcache from the prior attempt and simply gets re-associated with the new write request with the younger timestamp (W1 at T3).

Proxy 453, meanwhile, receives an accept regarding W2 from both storage servers 456 and 457. Accordingly, proxy 453 is able to send a write acknowledgment to Client 2 regarding W2 and also a commit message to storage servers 456 and 457 pertaining to W2. Because a commit message pertaining to W2 has been received, the storage servers are able to make the W2 request as committed in the reorder buffer and drain it to the underlying storage system (presuming there are no other older interfering writes in the reorder buffer).

Note that in the case that W1 arrives at the storage servers with its new timestamp T3, it would not prevent W2 from being drained to the underlying storage system because this time around W1 has a younger timestamp. In other words, it is not an 'older' interfering write. Because W1 now has a younger timestamp T3, it is accepted by both storage servers and inserted into the reorder buffer. Subsequently, W1 is marked as committed in the reorder buffer (upon receiving a commit from proxy 451) and also drained to the underlying storage system.

In one embodiment, the reorder buffer has the logic to determine that both W1 with younger timestamp T3 and W2 with timestamp T2 are writing to the same overlapping location in the underlying storage system and, accordingly, the reorder buffer will only send W1 to the underlying storage system (at least with respect to the overlapping part). In a different embodiment, the reorder buffer may drain both W1 and W2 to the underlying storage system, where W2 gets written first (using timestamp T2) and then gets overwritten (in part or completely) by W1 (using timestamp T3).

It should be noted that as to the overlapping region between the write requests associated with W1 and W2, W1 wins. In other words, because W1 gets a new younger timestamp T3 and is written into the underlying storage system after W2, the final storage will comprise the data of W1 (at least with respect to the overlapping parts between W1 and W2). The objective of the write process of FIG. 5 and the example illustrated in FIG. 6 is to ensure that all active storage servers in the cluster have the same data, such that there are no consistency violations to either multiple clients or a single client using multiple connections (multipath). In other words, it is not necessarily a concern of the storage system that W1 may have originated at an earlier time T1 as compared with W2 (which originated at the later time T2), so long as a consistent result is obtained between the active storage servers.

In one embodiment, the timestamps associated with their respective data units are stored in the 'dumb' underlying storage system (e.g., storage device 320) itself along with some simple comparison code. In such an implementation, when instructed to overwrite a particular data unit, the respective storage device 320 could ignore writing any data unit whose timestamp is older than the one already stored. The higher level, smarter storage server components, e.g., the storage server controllers 310, can then leverage this to not have to send writes for storage in any particular order, but rather, according to their own scheduling preference, since write-after-write hazards will automatically be avoided.

It should further be noted that the example of FIG. 6 was directed to resolving overlapping write requests. According to embodiments of the invention, the storage servers 300 logically service I/O requests, in particular, write requests, in an order determined by received timestamps. Note that "determined by" does not necessarily imply "chronologically"—as long as the proxies and storage servers follow consistent rules and fulfillment of the write requests is transparent to the clients, the proxies and storage servers may service non-overlapping write requests out of timestamp order.

As noted above, the rejection and retry method as illustrated in FIG. 6 advantageously guarantees consistency amongst the storage servers because all the storage servers agree on the order of writes that interfere. Moreover, latency is reduced because writes can be committed without needing to wait for the write requests to 'age out' of the reorder buffer and without the proxies needing to wait for an explicit 'committed' message back from the storage servers.

In one embodiment, in the exceptionally unlikely event that two write requests directed to the same address are formatted at exactly the same time, that is, with the same ti value, then any choice may be encoded into the storage controllers 310 to resolve the conflict as long as the storage servers are able resolve conflicts consistently. One such choice, in one embodiment, is simply to deny both requests, which must then be resubmitted. As another choice, if there is a hierarchy of clients, then the higher-ordered or priority client, identified by the client ID (node/thread ID) in the timestamp, may have its request serviced first (or last, so that its data will not be immediately overwritten), with other apparently simultaneous requests either ordered according to the hierarchy, or being rejected, such that they must be resubmitted. Note that a single client will in general not be able to issue different I/O requests simultaneously. In the case of client systems with the ability to issue more than one I/O request simultaneously, then either different internal processes or the necessarily different I/O connection devices (such as two different units 110) may be defined as separate clients and assigned different client IDs so as to enable resolution of such rare conflicts.

Read Operation

FIG. 7 depicts a flowchart illustrating the main computer implemented processing steps for a read operation for a distributed storage system using the enhanced write operation illustrated in FIG. 5 in accordance with an embodiment of the present invention.

At step 711, a client (initiator) 100 sends a read request to a proxy 200. The proxy forwards the read request to a data storage server 300 at step 712. Note that the proxy does not augment the read request with a time stamp.

At step 713, the read request is received at the storage server. At step 714, the controller 310 in the storage server determines if there are any interfering (e.g., overlapping) writes in the reorder buffer. In other words, the storage server determines if there are any writes in the reorder buffer that are attempting to access the same storage location as the read request.

If there are overlapping writes, then at step 716, the controller 310, orders the read (or inserts the read into the reorder buffer) immediately after the youngest of the interfering writes. These writes may be committed or not. In other words, the read is ordered after all interfering writes, whether or not they are committed.

For any newly arriving write that arrives after the read and overlaps with the read, the storage controller 310 would either reject the write (e.g., if it has an older timestamp than pre-existing writes) or the new write may be ordered after the read. Because the read is ordered immediately after the youngest of the overlapping writes, it waits until all the writes in the reorder buffer are resolved (e.g., they are either committed and drained to the underlying storage system or aborted) before it is sent to the underlying storage system at step 717.

If there are no overlapping writes determined at step 714, a record associated with the read request is inserted in the reorder buffer with the current storage server timestamp so that newly arriving writes with an older timestamp can be rejected. The read is then sent to the underlying storage system at step 717.

Once confirmation is received from the underlying storage system that the read request has been fulfilled, a response is sent to the proxy at step 718. The proxy then transmits the data read to the client at step 719.

It should be noted that the storage controller will observe proper read-after-write and write-after-read hazards, not allowing interfering request (e.g., overlapping requests where at least one of them is a write) to be outstanding to the underlying storage system at the same time.

Referring back to FIG. 6, if a read request that overlaps with W1 or W2 is sent by a client to one of the storage servers 456 or 457, while W1 and W2 are outstanding, the storage server receiving the read request will order the read immediately after W1 with timestamp T3 because it is the youngest of the interfering writes. The read then will need to wait till both W2 (with timestamp T2) and W1 (with timestamp T3) resolve and are drained to the underlying storage before it can be sent to the underlying storage system.

In one embodiment, the storage controller can forward data from committed, but not yet drained, writes to the reads (in case of overlap) to expedite the read process. This way, the read does not need to wait to get to the underlying storage before it receives its data. Accordingly, this avoids having to fully serialize overlapping reads and writes. In another embodiment, if the overlap between the read and the interfering write is partial, the controller can be programmed to merge data from the underlying storage system with data from the committed-but-not-drained write in the reorder buffer to service the read request.

In one embodiment, at step 714, if interfering writes are found in the reorder buffer that are uncommitted, the read request can be rejected and retried by the proxy.

In another embodiment, uncommitted data could be sent to the proxy on a read including an indication that the data is uncommitted. The proxy then has to wait for an indication that all the interfering writes have been committed, at which point, the previously uncommitted data for the read can be confirmed and returned to the client. Alternatively, if some interfering write is aborted, the uncommitted data cannot be confirmed, in which case the proxy would have to retry the read.

In one embodiment, if there are no interfering writes found in the reorder buffer at step 714, instead of inserting a record related to the read in the reorder buffer, the read can simply be serviced with existing data in the underlying storage In another embodiment of the present invention, a proxy server may send a read command, requested by a client, to a single storage server, in particular, the preferred storage server for that data, and that storage server returns the current data (committed or not), the timestamps of the constituent overlapping writes (assuming there are one or more), and an indication (per constituent write) of whether the data is committed or not. If all the data is committed, the proxy may return the data to the requesting client and the read transaction is done.

However, if not all the data is committed, the proxy may poll the storage server for commitment or cancellation of the constituent interfering writes. If they subsequently commit, the proxy can return the data to the client and the read transaction is complete. This poll may re-request the data (with a new timestamp for the new version and a new commitment flag), or it can merely poll to confirm the commitment or cancellation of the timestamp (associated with the constituent write) without new data being transferred. However, if any of the read components (in other words, any interfering writes associated with the read request) is either cancelled, or the storage server does not know (because the reorder buffer is finite), then the read (or at least any ambiguous constituent writes in question) needs to be retried by the proxy or, alternatively, by the storage server itself.

Some embodiments of the present invention include, in the proxies, a repair agent 225 (FIG. 2) that implements a mechanism to perform "repair reads", which are operations to distribute committed writes to storage servers that missed them because they were down at the time. In short, during a read operation, if it is known from examining the corresponding write timestamp that at least one storage server, which should have the same data, was not operational during the most recent write, but has since again become active, then the most recent version of the data can at the time of the read be written into the "revived" storage server.

C) An Enhanced Method for Performing a Write and Read Using a Future Buffer in a Distributed System that Ensures Consistency, Low Latency, and Full-Forward Progress While the enhanced method for performing a read and write (as discussed in Section B) reduces latency and ensures consistency, one of the drawbacks it can suffer from is that it does not allow for forward-progress guarantees. Because of retries in the write process (and in certain embodiments of the read process), there may be scenarios where the write or read processes may be re-trying for long periods of time without any success. For example, if two clients are busily trying to write the same block over and over, there is no guarantee that one of them does not starve the other out with the starved out client continuously retrying its writes with progressively increasing timestamps.

With reference to the example in FIG. 6, it may be that both client 1 454 and client 2 455 are attempting to write the same block over and over. In this scenario, for example, proxy 451 may keep trying to attempt writes from client 454, but may keep getting starved out by writes from client 455 coming in through proxy 453. In this case, forward progress of the protocol is impeded because client 454 may be stuck in a loop attempting retries without being able to move forward.

Note that, by comparison, the method for performing a standard write and read discussed above guarantees forward progress but suffers from high latency.

Write Operation

In one embodiment of the present invention, features of the standard write process (discussed above in section A) can be combined with features of the enhanced write process (discussed above in section B) in a way such that the resulting write procedure has the expected low latency of the enhanced algorithm but has the forward progress guarantees of the standard process at the expense of increased latency in a scenario where repeated retries are delaying forward progress.

Figure 8:
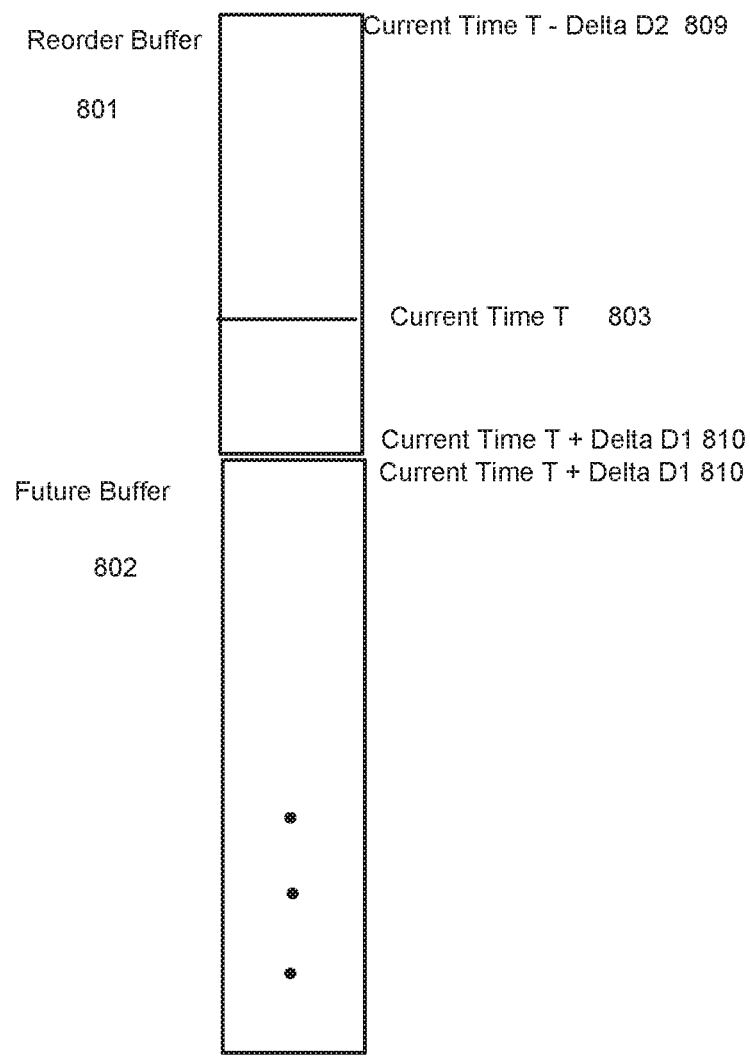
FIG. 8 is an exemplary illustration of the manner in which the reorder buffer is augmented with a 'future buffer' in accordance with an embodiment of the present invention.

In one embodiment, in order to combine features of both write processes, the reorder buffer can be augmented with a data structure called a 'future buffer.' FIG. 8 is an exemplary illustration of the manner in which the reorder buffer is augmented with a 'future buffer' in accordance with an embodiment of the present invention. As mentioned previously, the reorder buffer 801 comprises the current time T 803 and extends a finite amount of time into the past (e.g., a certain length of time Delta D2) and finite amount of time into the future (e.g., a certain length of time Delta D1). For example, it may extend 2 seconds into the past (Delta D2=2 seconds) and 1 second into the future (Delta D1=1 second).

In one embodiment, the future buffer 802 starts where the reorder buffer 801 ends. For example, if the reorder buffer extends from 2 seconds in the past to 1 second in the future, then the future buffer starts at 1 second in the future, e.g., at Current Time T+Delta D1 as illustrated in FIG. 8. In one embodiment, the future buffer can extend indefinitely in the future.

In one embodiment, a bit is added to write requests being disseminated by the proxy servers to the storage servers to indicate whether a write is a "present write" or a "future write." In the flowchart illustrated in FIG. 5, for example, the proxy server, at step 571, in addition to the timestamp would augment a write request with a bit indicating its status as a present write or a future write. Similarly, if reads are to be retried, then, in one embodiment, a bit can be added to distinguish "present reads" from "future reads."

In one embodiment, writes and reads start out as present writes and present reads which are treated the same way as illustrated in FIGS. 5 and 7 respectively. In other words, a "present write" is simply treated as an enhanced write using the procedure illustrated in FIG. 5. The only difference is that at step 571, the write request is flagged with a bit that indicates that it is a "present write" (rather than a "future write.") Similarly, a "present read" is simply treated as an enhanced read using the procedure illustrated in FIG. 7. For example, at step 712 of FIG. 7, the proxy server can flag the present read with a status bit indicating that it is a present read. Accordingly, because writes and reads start out as "present writes" and "present reads," the storage servers can ignore the future buffer 802 for present requests.

However, if a request (read or write) is retried too many times, the proxy demotes it to the corresponding future request, adds an offset to the timestamp that will cause the request to be mapped to the future buffer (i.e. it is in the future of the reorder buffer) at the storage servers. For example, in FIG. 5, if a reject is received from any of the storage servers, at step 579 the proxy retries the write request with a new timestamp. In one embodiment of the present invention, comparison logic circuitry in the proxy server would determine if a request has been retried over a threshold number of times. If the number of requests are over the predetermined threshold, the proxy server changes the status bit on the request to indicate that it is a "future write" (or "future read") and adds an offset to the timestamp at step 571. Adding the offset to the timestamp will most likely cause the request to be mapped to future buffer 802 because the offset added will typically be larger than (Delta D1+Delta D2). In other words, the offset, in one embodiment, will be the full time-length of the reorder buffer in order to ensure that the request will be considered a "future write" by the storage servers and end up in future buffer 802.

A future request is only rejected by a storage server if it is in the present or past when it arrives at the storage node. If the future request is indeed in the future (e.g., bears a timestamp that is greater than Current Time T+Delta D1), it is inserted in the future buffer in timestamp order, but not processed until it ages and is promoted into the reorder buffer, in a manner similar to the way that the basic protocol works (as shown in FIGS. 5 and 7). In other words, current time T 803 will eventually catch up with the start time for the future buffer (Current Time T+Delta D1 810 in FIG. 8), at which point, the earliest request in the future buffer can 'age out' of the future buffer and be promoted into the reorder buffer. Stated differently, A future write is marked with some time, e.g., T2. As current time T keeps advancing, at some point Current Time T+Delta D1 becomes equal to T2, at which point that future write is aged out of the future buffer and into the reorder buffer since its timestamp is now within the time bounds of the reorder buffer and out of the time bounds of the future buffer.

In one embodiment, the future buffer ages in real time, at the same rate as the present portion of the reorder buffer. When a request in the future buffer ages so that it would fall into the reorder buffer, it is immediately promoted to the reorder buffer, with priority higher than that for newly arriving present requests. As it enters the reorder buffer at the 'future end' of the reorder buffer (e.g. at time 810), and exactly when the boundary of the reorder buffer moves to its timestamp, it is not possible for the reorder buffer to contain a present request with a younger timestamp than the future request just entering the reorder buffer (in other words, no present request can contain an earlier timestamp than time 810). The request just promoted from future to present by the storage node will subsequently cause interfering present requests with older timestamps that arrive after such a promoted request to be rejected. Thus such a future request promoted to a present request cannot be rejected (except originally if it did not, in fact, arrive in the future). Once it is in the present portion of the reorder buffer, it can be handled as a present write.

The proxy and storage server handle writes demoted to future writes with the 4-way handshake protocol (originally discussed in connection with the standard write procedure), rather than the 3-way handshake protocol (for the enhanced write). For example, the storage node accepts the write when it enters the future buffer and the proxy can commit it when all the storage nodes have accepted it. However, the proxy server does not send the write acknowledgement to the client until after the proxy receives the committed signal from the storage server (the fourth leg of the handshake), which the storage node cannot send until the future write is promoted into a present write. Once the proxy receives the 'committed' message from all the relevant storage nodes, it can send the write acknowledgment to the clients.

Figure 9:
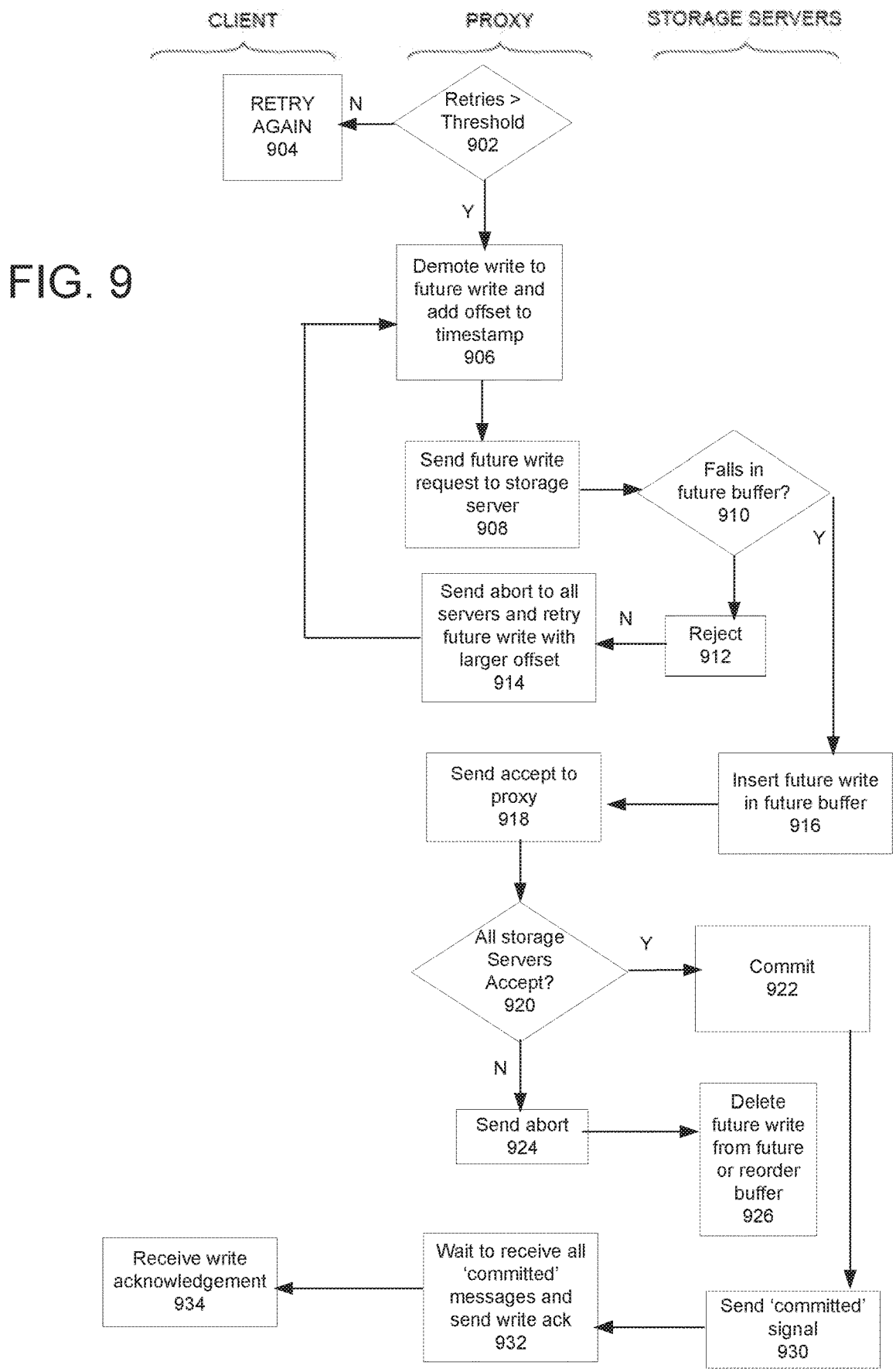
FIG. 9 depicts a flowchart illustrating the main computer implemented processing steps for an enhanced write operation for a distributed storage system that ensures consistency, low latency and full-forward progress using a future buffer in accordance with an embodiment of the present invention.

FIG. 9 depicts a flowchart illustrating the main computer implemented processing steps for an enhanced write operation for a distributed storage system that ensures consistency, low latency and full-forward progress using a future buffer in accordance with an embodiment of the present invention. It should be noted that FIG. 9 depicts the manner in which a write operation is treated after it has been demoted to a "future write." While the write request is still a "present write," it will be handled in a similar fashion to the process illustrated in FIG. 5. Accordingly, the discussion below will reference FIG. 5 to illustrate the manner in which a write request is handled while it is still a "present write."

A client 100 sends a write request to a proxy server 200 at step 570. The proxy initiates a count of retries, marks the write request as a "present write," and augments the write request with a timestamp at step 571. The proxy then forwards the request to the relevant storage servers 300 at step 572 (e.g., the same write request may be transmitted to multiple storage servers). The proxy then waits for an accept or reject from the storage servers at step 573.

Each storage server checks the present write request for a valid timestamp at steps 581 and 582. By examining the reorder buffer 330 and/or NVcache 335, each storage server may first determine if the request falls within temporal bounds. If the timestamp is invalid (because it is found to be too old at step 581 or too far into the future at step 582), the write is rejected at step 586.

If the timestamp is not outside the reorder buffer window, then at step 583, the controller 310 checks the write to determine if it overlaps with other requests in the reorder buffer. If there is no overlap found at step 583, the new write request is accepted at step 585 and inserted in the reorder buffer.

If the new request interferes with another write (e.g. overlaps with another write) then, at step 584, the controller 310 compares the timestamp of the new request with the other write that was already in the reorder buffer. If the newly incoming write is not the most recent (youngest), it is rejected; if it is, it may be accepted. In other words, if the new request has an older timestamp than the write it interferes with, the new request is rejected at step 586. However, if the new request has a younger timestamp compared to the other write that was already in the reorder buffer, then the new request is accepted and simply inserted into the reorder buffer in timestamp order at step 585.

The proxy server, meanwhile, waits for accepts and rejects from the multiple storage servers at step 573. It should be noted that if the proxy receives a reject from any of the servers at step 578, then the proxy will cancel or abort the write request to all the servers (at step 580) and retry the write with a new timestamp at step 579. Further, the proxy will also increment the retry count. In other words, the proxy collects responses from all the relevant storage nodes and if any server rejected the write, the proxy sends an abort to the relevant storage nodes and retries the write sequence with a new timestamp (at step 571) if the retry count has not exceeded the predetermined threshold. At step 571, on a retry, the proxy again marks the write as a "present write," augments the write with a newer timestamp and forwards it to the storage servers.

Note that if the retry count has exceeded the predetermined threshold, then the process skips to step 906 of FIG. 9 (as will be discussed further below).

If all storage servers accepted the write, then the proxy server can, in parallel, send the write acknowledgment to the client at step 589 and a commit message to all the relevant storage nodes at step 588.

On an abort, each storage server (to which the write request is sent) deletes the present write request from the reorder buffer.

On a commit from the proxy (at step 588), the storage server marks the present write request as committed in the reorder buffer and, if there are no older interfering writes in the reorder buffer, it drains it to the underlying 'dumb' storage system. If there are interfering older writes, it waits for all of those to be deleted (if they are to be aborted) or drained (if they have already been committed) until there are no older interfering writes and then drains the committed write to the underlying storage system. It should be noted that no 'committed' message that is sent to the proxy when a present write (that has been accepted by all storage servers) is drained.

In one embodiment, the controller 310 in the storage server retains a record in the reorder buffer of the committed write including its timestamp and bounds (reorder buffer bounds associated with the write request). The record need only be retained in the reorder buffer until it is 'aged out,' or, in other words, until its timestamp is old enough that any write request with an even older timestamp would be summarily rejected as being too old.

In one embodiment, as noted above, if the retry count has not exceeded the predetermined threshold, as determined at step 902 of FIG. 9, the proxy server continues to retry the request by returning to step 571. If the retry count has exceeded the predetermined threshold, the proxy stops attempting retries and demotes the write request that reached its write retry threshold into a future write. It should be noted that for embodiments of the present invention comprising a "future buffer," step 579 of FIG. 5 can further include a determination as to whether a threshold number of retries have been attempted. In other words, step 579 can perform the same decision-making as step 902 of FIG. 9.

In order to demote the "present write" to a "future write," the proxy collects the current time as a timestamp, adds an offset that will guarantee that the write will be considered a future write by the storage nodes (e.g. the full length of the reorder buffer) and sends it to the relevant storage servers. For example, the offset will be at least 3 seconds in a scenario where the reorder buffer is 3 seconds long (because it extends to 2 seconds in the past and 1 second in the future).

When a data storage server receives a future write request, it checks that its timestamp in fact falls into the future buffer. In other words, at step 910, the data storage server ensures that the timestamp for the future write request is in the future of the future edge of the reorder buffer. If, at step 910, it determines that the request does not fall in the future buffer, it rejects it at step 912. If the proxy receives a rejection from any storage server for a future write, at step 914, it sends an abort message to all the relevant storage servers and retries the future write with an even larger time offset into the future. (Note that this will typically not happen if the various time constants are calculated correctly and the clocks are suitably synchronized with the maximum effective skew included in the calculation).

If the timestamp is found to be valid at step 910, the storage server inserts the future write in the future buffer sorted in timestamp order at step 916, and sends an accept message to the proxy at step 918.

If the proxy receives accepts from all the relevant storage servers at step 920, at step 922 it sends a commit message to all the storage servers to which it sent the future write request. Note, that the proxy does not yet send a write acknowledgement to the client/originator.

If the proxy does not receive an accept from all the relevant storage servers at step 920, it sends an abort to all the relevant storage servers at step 924. If a storage server receives an abort for a write in the future buffer or reorder buffer at step 926, it deletes it from whichever buffer it resides. (Note again that if the time constants are calculated correctly and the clocks are suitably synchronized, this will typically not happen for a future write or a write in the reorder buffer that was promoted from the future buffer.)

If a storage server receives a commit for a write that was promoted from the future buffer into the reorder buffer, it marks it as committed and sends a 'committed' message to the proxy. Such a write is then allowed to drain into the dumb storage system as if it had never been a future write. If a storage server receives a commit for a write in the future buffer at step 922, it marks it as committed but does not send a 'committed' message to the proxy. Note that it does not send a commit message to the proxy if the write is still in the future buffer. In other words, the committed message is sent to the proxy by the server at the earliest time that a write that was originally a future write satisfies both the following conditions: a) has received the commit message from the proxy; and b) has been aged out of the future buffer into the reorder buffer. As these two events can happen in either order, the committed message can happen either when the request receives the commit message (as the request had already been aged out of the future buffer and into the reorder buffer) or when the request ages out of the future buffer into the reorder buffer (if the commit message had already been received).

The storage nodes, each independently, promote future writes from the future buffer to the reorder buffer when the time of the 'future edge' of the reorder buffer reaches the timestamp of the future write. At the time of promotion, if they were mark as committed, a 'committed' message is sent to the proxy at step 930. If they were not yet marked as committed, they remain uncommitted, but also marked as being originally future writes. The promoted futures writes, when moved into the reorder buffer, need to be marked in order to remember that a committed message needs to be sent to the proxy, which present writes do not require.

A future write that has been promoted to the reorder buffer and has been committed acts identically to a present write that has been committed. A future write that has been promoted to the reorder buffer and has not yet been committed acts almost identically to a present write that has not yet been committed, the only difference being that if/when it is committed, a 'committed' message is sent to the proxy (at step 930). Note that the 'committed' message is never sent while the future write resides in the future buffer. It is sent when it's promoted to the reorder buffer and it was already marked as committed. Otherwise, if it was already promoted to the reorder buffer, it is sent when it receives the commit message from the proxy. Note also that the promotion of future writes from the future buffer to the reorder buffer has priority over any newly arriving present writes to the storage node. That is, the system operates as if the future write was promoted from the future buffer to the reorder buffer exactly at the (local) time indicated by the timestamp of the future write timestamp so that if a present write arrives 'simultaneously' with a younger timestamp than the future write being promoted, the present write is rejected because it is in the future of the reorder buffer. Thus promotion of future writes to the reorder buffer occurs when all the writes in the reorder buffer are guaranteed to have older timestamps, and hence they can never be 'out of order'.

At step 932, when a proxy receives all the 'committed' messages for a write at that it had sent to the relevant storage servers as a future write at step 908, it sends the write acknowledgement to the client/originator. At step 934, the client receives the write acknowledgement from the proxy.

Note that several variations of the embodiment discussed in connection with FIG. 9 are possible. For example, if the clocks are sufficiently synchronized and the time constants calculated correctly, future writes are never retried, guaranteeing forward progress (bounded number of retries as a "present write" plus one retry as a "future write"). However, better performance and lower latency may be achieved by trying to use a smaller offset for future writes, and using 'exponential back-off' if future writes are retried as described above. Eventually, the exponentially increasing time offset will be large enough that the future write will no longer be retried.

In another embodiment, the future buffer and reorder buffer can be combined into a single data structure, as long as the behavior remains as described above, and writes can be distinguished as belonging to the present time window or the future.

Read Operation

In one embodiment, read operations are processed in the same way as the enhanced reads described above (in section B).

In one embodiment, reads that overlap uncommitted writes may be retried. The proxy would then also implement a read retry counter, and when the retry counter for a read reaches the read retry threshold, it would then send the read operation as a "future read." A future read is treated in a similar way to the enhanced read. In other words, the "future read" is treated as a "present read" once it is promoted into the reorder buffer and serviced prior to any pending overlapping write operation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments (e.g., see FIGS. 3, 4, 5, 7 and 9) may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for performing a write operation in a distributed storage system, the method comprising:
   receiving a write request from a client at a proxy server, wherein the proxy server is disposed between one or more clients and one or more storage servers as an intermediary, and wherein the proxy server is configured to receive read requests and write requests from the one or more clients and distribute the read requests and the write requests to the one or more storage servers;
   augmenting the write request with a timestamp at the proxy server;
   responsive to a determination at the proxy server that the time-stamped write request has been retried over a threshold number of times, setting a status for the time-stamped write request as a future write and adding a first offset to the timestamp of the time-stamped write request, wherein the proxy server is configured to augment the time-stamped write request with a status indication indicating that the time-stamped write request comprises a future write;
   transmitting the time-stamped write request from the proxy server to a storage server of the one or more storage servers, wherein the storage server comprises a reorder buffer and a future buffer, wherein the reorder buffer is a timestamp ordered data structure for holding the read requests and the write requests while timestamps associated therewith are examined, wherein the reorder buffer maintains a time window comprising an interval of time into a past from a current time and an interval of time into a future from the current time, and wherein a time window of the future buffer starts at a future time where the time window of the reorder buffer ends;
   receiving an accept at the proxy server from the storage server responsive to a determination at the storage server that the timestamp including the first offset associated with the time-stamped write request is within the time window of the future buffer, wherein the accept originates from the storage server in response to the storage server inserting the time-stamped write request into the future buffer.

2. The method of claim 1, wherein the first offset is equal to at least a duration of the time window of the reorder buffer.

3. The method of claim 1, further comprising:
   receiving a reject from the storage server responsive to a determination at the storage server that the time-stamped write request is not within the time window of the reorder buffer;
   sending an abort to all storage servers in a cluster receiving the time-stamped write request; and
   re-trying the time-stamped write request with a second offset, wherein the second offset is larger than the first offset.

4. The method of claim 1, further comprising:
   sending a commit to the storage server responsive to receiving an accept from all storage servers in a cluster receiving the time-stamped write request, wherein the storage server is operable to mark the time-stamped write request in the future buffer as committed, and wherein further the time-stamped write request has not yet been promoted to the reorder buffer.

5. The method of claim 1, further comprising:
   sending a commit to the storage server responsive to receiving an accept from all storage servers in a cluster receiving the time-stamped write request, wherein the storage server is operable to mark the time-stamped write request in the reorder buffer as committed, and wherein further the time-stamped write request has been promoted to the reorder buffer.

6. The method of claim 1, further comprising:
   sending an abort to the storage server responsive to receiving a reject from any one of the storage servers in a cluster receiving the time-stamped write request, wherein the storage server is operable, responsive to the abort, to delete the time-stamped write request from the future buffer if the time-stamped write request has not yet been promoted to the reorder buffer or from the reorder buffer if the time-stamped write request has been promoted to the reorder buffer.

7. The method of claim 4, further comprising:
receiving a committed signal from the storage server; and
responsive to receiving a committed signal from all storage servers in the cluster, sending a write acknowledgment to the client.

8. The method of claim 5, further comprising:
receiving a committed signal from the storage server, wherein the storage server is operable to transmit the committed signal after the time-stamped write request has been promoted from the future buffer to the re-order buffer; and
responsive to receiving a committed signal from all storage servers in the cluster, sending a write acknowledgment to the client.

9. The method of claim 1, wherein a timestamp for the time-stamped write request comprises a time indication derived from a current time signal output from a time source, wherein the time source is selected from a group consisting of: Network Time Protocol (NTP) clocks, Precision Time Protocol (PTP) blocks, GPS receivers, traditional atomic clocks, or single-chip, atomic-clock-quality frequency generators.

10. A non-transitory computer-readable storage medium having stored thereon, computer executable instructions that, if executed by a proxy server cause the proxy server to perform a method for performing a write operation in a distributed storage system, the method comprising:
receiving a write request from a client at the proxy server, wherein the proxy server is disposed between one or more clients and one or more storage servers as an intermediary, and wherein the proxy server is configured to receive read requests and write requests from the one or more clients and distribute the read requests and the write requests to the one or more storage servers;
augmenting the write request with a timestamp:
responsive to a determination that the time-stamped write request has been retried over a threshold number of times, changing a status for the timestamped write request to a future write and adding a first offset to the timestamp for the time-stamped write request, wherein the proxy server is configured to augment the time-stamped write request with a status indication indicating that the time-stamped write request comprises a future write;
transmitting the time-stamped write request to a storage server of the one or more storage servers, wherein the storage server comprises a reorder buffer and a future buffer, wherein the re-order buffer is a timestamp ordered data structure for holding the read requests and the write requests while timestamps associated therewith are examined, wherein the reorder buffer maintains a time window comprising an interval of time from a current time into a past and an interval of time into a future from the current time, and wherein the future buffer starts a time window at a future time where the time window of the reorder buffer ends;
receiving an accept from the storage server responsive to a determination at the storage server that the timestamp including the first offset associated with the time-stamped write request is within the time window of the future buffer, wherein the accept originates from the storage server in response to the storage server inserting the time-stamped write request into the future buffer.

11. The non-transitory computer-readable medium as described in claim 10, wherein first offset is equal to at least a duration of the time window of the reorder buffer.

12. The non-transitory computer-readable medium as described in claim 10, wherein the method further comprises:
receiving a reject from the storage server, responsive to a determination at the storage server that the time-stamped write request is not within the time window of the reorder buffer;
sending an abort to all storage servers in a cluster receiving the time-stamped write request; and
re-trying the time-stamped write request with a second offset, wherein the second offset is larger than the first offset.

13. The non-transitory computer-readable medium as described in claim 10, wherein the method further comprises: responsive to receiving an accept from all storage servers in a cluster receiving the time-stamped write request, sending a commit to the storage server, wherein the storage server is operable to mark the time-stamped write request in the future buffer as committed, wherein the time-stamped write request has not yet been promoted to the reorder buffer.

14. The non-transitory computer-readable medium as described in claim 10, wherein the method further comprises:
responsive to receiving an accept from all storage servers in a cluster receiving the time-stamped write request, sending a commit to the storage server, wherein the storage server is operable to mark the time-stamped write request in the reorder buffer as committed and, wherein further the time-stamped write request has been promoted to the reorder buffer.

15. The non-transitory computer-readable medium as described in claim 10, wherein the method further comprises:
responsive to receiving a reject from any one of the storage servers in a cluster receiving the time-stamped write request, sending an abort signal to the storage server, wherein the storage server is operable to delete the time-stamped write request from the future buffer if the time-stamped write request has not yet been promoted to the reorder buffer or from the reorder buffer if the time-stamped write request has been promoted to the reorder buffer.

16. The non-transitory computer-readable medium as described in claim 10, wherein a timestamp for the time-stamped write request comprises a time indication derived from a current time signal output from a time source, wherein the time source is selected from a group consisting of: Network Time Protocol (NTP) clocks, Precision Time Protocol (PTP) blocks, GPS receivers, traditional atomic clocks, or single-chip, atomic-clock-quality frequency generators.

17. A proxy server for performing a write operation in a distributed storage system, said proxy server comprising:
a memory comprising instructions for a protocol to perform a write operation;
a communicative interface operable to allow communication between a plurality of storage servers and a plurality of clients, wherein the proxy server is disposed between the plurality of storage servers and the plurality of clients as an intermediary;
a controller comprising a processor, wherein the processor is coupled to the memory and the communicative interface, and wherein the processor is configured to:

receive a write request from a client; augment the write request with a timestamp:

responsive to a determination that the time-stamped write request has been retried over a threshold number of times, change a status for the timestamped write request to a future write and adding a first offset to the timestamp for the time-stamped write request, wherein the proxy server is configured to augment the time-stamped write request with a status indication indicating that the time-stamped write request comprises a future write;

transmit the time-stamped write request to a storage server comprising a reorder buffer and a future buffer, wherein the re-order buffer is a timestamp ordered data structure for holding the read requests and the write requests while timestamps associated therewith are examined, wherein the reorder buffer comprises a time window comprising an interval of time into a past from a current time and an interval of time into a future from the current time, and wherein a time window of the future buffer starts at a future time where the time window of the reorder buffer ends;

receive an accept from the storage server responsive to a determination at the storage server that the timestamp including the first offset associated with the timestamped write request is within a time window of the future buffer, wherein the accept originates from the storage server in response to the storage server inserting the time-stamped write request into the future buffer.

18. The proxy server described in claim 17, wherein the first offset is equal to at least a duration of the time window of the reorder buffer.

19. The proxy server as described in claim 17, wherein the processor is further configured to:
receive a reject from the storage server responsive to a determination at the storage server that the time-stamped write request is not within the time window of the reorder buffer;
send an abort to all storage servers in a cluster receiving the time-stamped write request; and
re-try the time-stamped write request with a second offset, wherein the second offset is larger than the first offset.

20. The proxy server as described in claim 17, wherein the processor is further configured to:
send a commit to the storage server responsive to receiving an accept from all storage servers in a cluster receiving the time-stamped write request, wherein the storage server is operable to mark the time-stamped write request in the future buffer as committed, wherein the time-stamped write request has not yet been promoted to the reorder buffer.

* * * * *